(12) United States Patent
Wininger et al.

(10) Patent No.: US 8,090,462 B2
(45) Date of Patent: Jan. 3, 2012

(54) MAINTENANCE ASSISTANCE AND CONTROL SYSTEM METHOD AND APPARATUS

(75) Inventors: Shai Wininger, Haifa (IL); Yaron Eppel, Har Adar (IL); Amir Green, Moshav-Herut (IL)

(73) Assignee: Mobideo Technologies Ltd, Rosh Haayin (IL)

( * ) Notice: Subject to any disclaimer, the term of this patent is extended or adjusted under 35 U.S.C. 154(b) by 447 days.

(21) Appl. No.: 12/338,561

(22) Filed: Dec. 18, 2008

(65) Prior Publication Data
US 2009/0164490 A1    Jun. 25, 2009

Related U.S. Application Data

(60) Provisional application No. 61/006,125, filed on Dec. 19, 2007.

(51) Int. Cl.
G06F 19/00 (2006.01)
G06F 11/30 (2006.01)

(52) U.S. Cl. .......................................... 700/100; 702/184
(58) Field of Classification Search ................... 700/100; 702/184

See application file for complete search history.

(56) References Cited

U.S. PATENT DOCUMENTS

| | | | |
|---|---|---|---|
| 4,554,544 A | 11/1985 | Task | |
| 6,671,593 B2 | 12/2003 | Sinex | |
| 6,789,007 B2 | 9/2004 | Ellis et al. | |
| 6,816,762 B2 | 11/2004 | Hensey et al. | |
| 6,885,921 B1 | 4/2005 | Farmer | |
| 7,155,368 B2 | 12/2006 | Revie | |
| 2001/0005610 A1 | 6/2001 | Fukase et al. | |
| 2001/0050610 A1 | 12/2001 | Gelston | |
| 2002/0007288 A1 | 1/2002 | Endou | |
| 2003/0187823 A1* | 10/2003 | Ahl et al. .......................... 707/1 | |
| 2004/0111197 A1* | 6/2004 | Kipersztok et al. ............. 701/29 | |
| 2005/0273229 A1 | 12/2005 | Steinmeier et al. | |
| 2005/0273230 A1 | 12/2005 | Steinmeier et al. | |
| 2007/0010923 A1 | 1/2007 | Rouyre | |
| 2007/0050360 A1 | 3/2007 | Hull et al. | |
| 2009/0138874 A1* | 5/2009 | Beck et al. ..................... 717/173 |
| 2009/0254403 A1* | 10/2009 | Nagalla et al. .................... 705/9 |

FOREIGN PATENT DOCUMENTS

| | | |
|---|---|---|
| JP | A-2003-2289 | 1/2003 |
| JP | A-2004-178059 | 6/2004 |
| WO | WO 01/09724 A1 | 2/2001 |
| WO | WO 02/17026 A2 | 2/2002 |
| WO | WO 03/106438 A1 | 12/2003 |
| WO | WO 2007/059314 A2 | 5/2007 |

OTHER PUBLICATIONS

Modules obtained from http://www.mxi.com, Jan. 11, 2006, Mxi Technologies Ltd.

* cited by examiner

*Primary Examiner* — Ryan Jarrett
(74) *Attorney, Agent, or Firm* — Oliff & Berridge, PLC

(57) ABSTRACT

There is provided a method and an apparatus for providing assistance and control in respect of maintenance operations that are based on electronic technical documentation prescribing a set of discrete electronic maintenance instructions ("EMIs"). The EMIs are connected to one another according to a predefined hierarchy and predefined order. The apparatus of the present invention includes a navigation controller, a documentation management module and an instruction controller generator.

50 Claims, 12 Drawing Sheets

FIG. 2

```
<content>
<library docid="1" name="Sliverlight CLASS B AIRCRAFT">           ← 210
<book docid="2" name="O-LEVEL MAINTENANCE MANUALS">               ← 220
<chapter docid="3" name="PREFLIGHT" duration="6000">              ← 230
<section docid="4" name="PRECONDITIONS" duration="350" approval="0"    ← 240A
style="workcard">
  <unit docid="5" duration="45" style="workcard" approval="1">    ← 250
    <body>MAINTENANCE CERTIFICATION CLASS 5B</body>
  </unit>
</section>
<section docid="6" name="TOOLS" duration="-1" approval="0" style="inventory_list">   ← 240B
  <unit docid="7" duration="50">                                  ⎫
    <body>STANDARD ISSUE MECHANIC TOOLBOX</body>                  ⎬ 250
  </unit>                                                         ⎪
  <unit docid="8" duration="80" approval="1">                     ⎪
    <body>PROTECTIVE GEAR</body>                                  ⎭
  </unit>
</section>
<section docid="9" name="MATERIALS" style="inventory_list">      ← 240C
  <unit docid="10">                                               ⎫
    <body>REPLACEMENT CONNECTOR RINGS</body>                      ⎬ 250
  </unit>                                                         ⎪
  <unit docid="45">                                               ⎪
    <body>CONNECTOR SEALANT</body>                                ⎭
  </unit>
</section>
<section docid="11" name="PAGE 1 : DISCONNECT MAIN POWER FEED"    ← 240D
style="workcard">
  <unit docid="12" duration="250">                                ⎫
    <body>DISCONNECT MAIN POWER CABLE:</body>                     ⎬ 250
    <unit docid="13" duration="45" approval="1">                  ⎪
      <body>DISCONNECT POWER CABLE FROM WALL SOCKET</body>        ⎭
  </unit>
```

```xml
<unit docid="14" duration="35" qualification="3">
  <body>OPEN POWER FEED DOOR</body>
</unit>
<unit docid="15" duration="20" approval="3" qualification="-1">
  <body>RELEASE POWER CABLE CONNECTOR SAFETY PIN</body>
</unit>
<unit docid="16" duration="60" approval="1">
  <body>UNSCREW CONNECTOR RINGS</body>
</unit>
<unit docid="17" action="addmodify" duration="45">
  <body>PULL CABLE TO DISCONNECT</body>
</unit>
</section>
<section docid="18" name="PAGE 2 : INSPECT LANDING GEAR">
<unit docid="40" duration="0" approval="1" type="warning">
  <body>FAILURE TO INSPECT LANDING GEAR MAY RESULT IN SERIOUS DAMAGES</body>
</unit>
<unit docid="19" duration="0" approval="0">
  <body>CHECK LANDING GEAR FOR CRACKS IN PAINT</body>
</unit>
<unit docid="20" duration="0" style="workcard" approval="0">
  <body>INPECT OIL FEEDERS</body>
</unit>
<unit docid="51" type="input" valuetype="numeric" units="lb." range="0-50">
  <body>ENTER OIL LEVEL READING IN LEFT GAUGE:</body>
</unit>
</section>
</chapter>
</book>
</library>
</content>
```

FIG. 2 Continued

| IIC ID | Activation Time | Event Time | Total Duration in 'Active' State | Net Duration In 'Active' State | Event Description | State Switched To | Input |
|---|---|---|---|---|---|---|---|
| 1.1 | 28/08/2008, 18:35:05 | 28/08/2008, 18:35:25 | 20 Sec. | 20 Sec. | Navigate Down | Idle | |
| 1.2 | 28/08/2008, 18:35:26 | 28/08/2008, 18:35:31 | 6 Sec. | 6 Sec. | Navigate Up | Idle | |
| 1.1 | 28/08/2008, 18:35:05 | 28/08/2008, 18:35:41 | 26 Sec. | 20 Sec. | Invoke Tech. Drawing | NA | |
| 1.1 | 28/08/2008, 18:35:05 | 28/08/2008, 18:36:27 | 77 Sec. | 71 Sec. | Dismiss Tech. Drawing | NA | |
| 1.1 | 28/08/2008, 18:35:05 | 28/08/2008, 18:36:44 | 93 Sec. | 87 Sec. | User Clicked 'Done' | Complete | |
| 1.2 | 28/08/2008, 18:35:26 | 28/08/2008, 18:38:23 | 177 Sec. | 104 Sec. | User Clicked 'Done' | Complete | |
| 1.3 | 28/08/2008, 18:38:24 | 28/08/2008, 18:40:15 | 111 Sec. | 111 Sec. | User Clicked 'Done' | Pending Authorization | |
| 1.3 | 28/08/2008, 18:38:24 | 28/08/2008, 18:41:46 | 212 Sec. | 212 Sec. | Senior Officer's Authorization Input | Complete | Password: wCEop435g |
| 1.4 | 28/08/2008, 18:41:47 | 28/08/2008, 18:48:03 | 376 Sec. | 376 Sec. | User Clicked 'Done' | Complete | |
| 1.5 | 28/08/2008, 18:48:03 | 28/08/2008, 18:48:09 | 6 Sec. | 6 Sec. | User Clicked 'Done' | Complete | |
| 2 | 28/08/2008, 18:48:10 | 28/08/2008, 18:49:01 | 51 Sec. | 51 Sec. | Resistance Level Input | NA | 8.1 (Ohm) |
| 2 | 28/08/2008, 18:48:10 | 28/08/2008, 18:48:03 | 53 Sec. | 53 Sec. | User Clicked 'Ok' | Complete | |

FIG. 6

| IIC/Item ID | User ID | User Avg. Time (Sec) | Team Avg. Time (Sec) | General Avg. Time (Sec) | Official Time (Sec) | Actual Time (Sec) | Notes |
|---|---|---|---|---|---|---|---|
| 1.1 | ABCD123 | 23 | 26 | 25 | 30 | 20 | |
| 1.2 | ABCD123 | 456 | 533 | 352 | 180 | 440 | |
| 1.3 | ABCD123 | 743 | 362 | 380 | 395 | 735 | |
| 1.4 | ABCD123 | 220 | 100 | 120 | 95 | | |
| 1.5 | ABCD123 | 180 | 350 | 380 | 395 | | |

FIG. 7A

MAINTENANCE ASSISTANCE AND CONTROL SYSTEM METHOD AND APPARATUS

CROSS-REFERENCE TO RELATED APPLICATIONS

This application claims the benefit of U.S. Provisional Patent Application No. 61/006,125, filed Dec. 19, 2007, the full disclosures of which is incorporated herein by reference for all purposes.

FIELD OF THE INVENTION

This invention is related to electronic maintenance assistance and control. More specifically, this invention relates to a system a method and an apparatus for providing assistance and control in respect of maintenance operations that are based on electronic technical documentation prescribing a set of discrete maintenance instructions.

BACKGROUND OF THE INVENTION

International Patent Application Publication No. WO/2001/009724 to Barto, discloses a mobile maintenance assistant which guides an inspector through an inspection process on a component of a system. A main processing system stores and serves a component breakdown structure for the system allowing the identification of the component. The main processing system also serves an inspection wizard, typically in the form of an expert system, that accesses a data structure for guiding the inspector through the inspection process. The inspector accesses the component breakdown structure and the maintenance wizard using a remote processing system, such as a personal data assistant or handheld class computer to allow an on-site inspection. The maintenance system records the observations of the inspector and produces a work specification describing needed maintenance for the component.

U.S. Pat. No. 6,671,593 to Sinex, discloses a dynamic aircraft maintenance production system for planning a maintenance check of an aircraft includes means for obtaining any routine tasks that may exist and which are required to be performed on the aircraft, means for obtaining any non-routine tasks that may exist and which are required to be performed on the aircraft, means for generating a maintenance flow chart detailing scheduling data for each of the routine and non-routine tasks, means for assigning a user-determined number of the routine and non-routine tasks to personnel for completion, means for maintenance activity data on each assigned routine task and non-routine task, means for available resource data, and means for updating the maintenance flow chart to reflect newly-obtained maintenance activity data and available resource data.

U.S. Pat. No. 6,885,921 to Farmer, discloses an apparatus and method for an aircraft maintenance server. The apparatus and method disclosed by Farmer includes a system in which an electronic package is created for delivery to the maintenance personnel. The electronic package includes all of the specific maintenance process tasks that must be performed to satisfy local, international governmental regulations as well as operator and aircraft manufacturer defined procedures. Additionally, the electronic package includes a list of parts that will be required for the specified tasks and, optionally, a flow chart illustrating the overall process.

SUMMARY OF THE INVENTION

According to one aspect of the invention, there is provided an apparatus for providing assistance and control in respect of maintenance operations that are based on electronic technical documentation prescribing a set of discrete electronic maintenance instructions ("EMIs") which are connected to one another according to a predefined hierarchy and predefined order. In some embodiments, the apparatus may include a navigation controller, a documentation management module and an instruction controller generator. The navigation controller is adapted to provide a context pointer or a group of context pointers referencing one or more respective EMIs. The context pointer or pointers indicate a subset of EMIs from among the set of discrete EMIs which constitute a current context within the set of discrete EMIs. The documentation management module is adapted to select a group of permitted EMIs from among the subset of EMIs in accordance with metadata associated with respective EMIs. The metadata may provide an access control specification related to the respective EMIs. The navigation controller may be further adapted to provide an active instruction pointer referencing a current active electronic maintenance instruction ("EMI") selected from among the group of permitted EMIs. The instruction controller generator is responsive to the active instruction pointer for generating at least a respective active interactive instruction-controller ("active IIC"). The active IIC is responsive to a predefined user-interaction and/or to a predefined system state or event corresponding with the active IC for switching a state of the active IIC to a predefined state that is related to the predefined user-interaction and/or to the predefined system state or event.

In a further embodiment, in response to the state of the active IIC being altered, a subsequent active instruction pointer is selected or a subsequent context pointer or a subsequent group of context pointers is selected. In yet a further embodiment, a subsequent context pointer or a subsequent group of context pointers are selected when the entire subset of EMIs which constitute the current context is complete.

In yet a further embodiment, the instruction controller generator is adapted to set a state of each interactive instruction controller ("IIC") that is not associated with the active instruction pointer to standby. In still a further embodiments, the instruction controller generator is adapted generate an IIC for each EMI from the group of permitted EMIs and to set the state of each IIC to standby except for the state of the (active) IIC that is associated with the active instruction pointer. The IIC that is associated with the active instruction pointer is the active IIC and the instruction controller generator is adapted to set its state to active.

In yet a further embodiment, the instruction controller generator is adapted to include within the active IIC data with respect to one or more possible states of the active IIC, and in association with each one of the one or more states, the instruction controller generator is adapted to specify a data input for triggering of the respective state. In yet a further embodiment, in connection with one or more of the states of the IIC, the instruction controller generator is adapted to provide a subsequent active instruction pointer or a subsequent context pointer or a subsequent group of context pointers that is associated with the respective state.

In still a further embodiment, the apparatus further may include an interaction tracker that is adapted to generate a record for the IIC, the IIC record comprising at least data related to the predefined user-interaction and/or the predefined system state or event corresponding with the IIC. In yet a further embodiment, the IIC record includes at least a temporal parameter that is related to at least one temporal aspect of the predefined user-interaction and/or the predefined system state or event corresponding with the IIC.

In yet a further embodiment, the apparatus further includes a data manager and maintenance tracking repository. The data manager is adapted to manage storage and communication of an IIC record generated by the interaction tracker. The maintenance-tracking repository that is adapted to store data thereon. The data manager is adapted to store the IIC record on the maintenance-tracking repository. In yet a further embodiment, the data manager is adapted to communicate the IIC record to a remote computerized device that is associated with the apparatus, to enable processing on the remote computerized device of information related to the EMI associated with the respective IIC. Processing of the IIC record may include taking into account a parameter or a circumstance associated with the user-interaction and/or with the predefined system state or event corresponding with the respective IIC. In yet a further embodiment, the remote computerized device is adapted to generate a temporal prediction based at least on the IIC record and historical or reference data related to the respective IIC record.

In yet a further embodiment, the documentation management module is adapted to select the group of EMIs in accordance with a current user's profile and/or according to predefined configuration rules, the user's profile specifying at least credentials for the respective user, and the configuration rules permit or restrict access to certain EMIs from among the subset of EMIs according to the user's profile and/or according to the metadata that is associated with the EMIs. In yet a further embodiment, the documentation management module is further adapted to determine the order and hierarchy of the maintenance instructions within the group of permitted EMIs in accordance with the predefined hierarchy and the predefined order according to which the set of EMIs are connected to one another. In yet a further embodiment, the documentation management module is adapted to include within the selected group EMIs which, based on the predefined hierarchy and the predefined order, surround, precede or succeed the EMI that is referenced by the active instruction pointer and which are permitted according to the configuration rules and/or based on the user's profile and the access control specification related to the respective EMIs. In yet a further embodiment, in addition to the active instruction pointer, the documentation management module is adapted to obtain a pointer for each EMI in the group of permitted EMIs.

In yet a further embodiment, the instruction controller generator is adapted to provide a presentation-specification for enabling rendering on a user-interface IICs associated with the permitted EMIs in the selected group. In yet a further embodiment, the instruction controller generator is adapted to generate the presentation-specification based on the current context pointer or the current group of context pointers, the current active instruction pointer, and the order and hierarchy according to which the set of EMIs are connected to one another.

In yet a further embodiment, the instruction controller generator is adapted to include within the presentation-specification data representative of the active IIC generated for the EMI referenced by the active instruction pointer. In yet a further embodiment, the instruction controller generator is adapted to include within the presentation specification, in association with or as part of the data corresponding to the active IIC, data representative of a content of the EMI referenced by the active instruction pointer.

In yet a further embodiment, with respect to the active IIC, the instruction controller generator is adapted to implement within the presentation specification a distinguishing presentation feature, to thereby enable distinctive presentation of the active IIC compared to the presentation of the other IICs corresponding to EMIs in the group of permitted EMIs that are not associated with the active instruction pointer.

In yet a further embodiment, the instruction controller generator is further adapted to implement an input field specification, and wherein according to the input field specification, the instruction controller generator is adapted to include within the presentation specification, in association with or as part of the data corresponding to the active IIC, data representative of an input field for enabling a data input in connection with the active IIC. In yet a further embodiment, the instruction controller generator is further adapted to characterize the input field that is to be associated with the active IIC according to a configuration rule related to input field specification and/or according to respective metadata of the EMI associated with the active IIC. In yet a further embodiment, the data representative of the input field may relate to one or more of the following types of input fields: a text input field, a drop-down list selection field, a radio-buttons selection field, a text box field, a file attachment field, a voice-recording input field, an image capture and recording field, a barcode input field, a global positioning system ("GPS") coordinates input field and a wireless reception parameter input field. In yet a further embodiment, the data representative of the input field may indicate one or more of the following as possible sources of input: a GPS device, a Wireless Communications link, Cellular data or voice communications signal, a Camera or an Imager, a RFID device, a IR link, a Data Cable link, a on-screen touch operated manual input and a hardware button manual input.

In yet a further embodiment, at least a portion of the data representative of the content of one or more of the permitted EMIs in the selected group that are not associated with the current active instruction pointer is disabled or removed from the presentation specification of the respective IICs.

According to another aspect of the invention, there is provided a computer implemented method of providing assistance and control in respect of maintenance operations that are based on electronic technical documentation prescribing a set of discrete EMIs which are connected to one another according to a predefined hierarchy and predefined order. In some embodiments, the computer implemented method of providing assistance and control in respect of maintenance operations may include obtaining a context pointer or a group of context pointers referencing one or more respective EMIs, the context pointer or pointers indicating a subset of EMIs from among the set of discrete EMIs which constitute a current context within the set of discrete EMIs; selecting a group of permitted EMIs from among the subset of EMIs in accordance with metadata associated with respective EMIs within the subset of EMIs, the metadata providing an access control specification related to the respective EMIs; selecting an active instruction pointer referencing a current active EMI, the current active EMI selected from among the group of permitted EMIs; and in response to selection of the active instruction pointer generating at least a respective active IIC that is responsive to a predefined user-interaction and/or to a predefined system state or event corresponding with the IIC for switching a state of the active IIC to a predefined state that is related to the predefined user-interaction and/or to the predefined system state or event.

In a further embodiment of the invention, selecting an active instruction pointer may include selecting a subsequent context pointer or a subsequent group of context pointers in case the entire subset of EMIs which constitute the current context is complete. In still a further embodiments of the invention, selecting an active instruction pointer comprises, selecting a subsequent active instruction pointer or a subsequent context pointer or group of context pointers based on the new state of the IIC.

In still a further embodiment of the invention, selecting a group of permitted EMIs may include setting a state of each IIC which corresponds to an EMI from the group of permitted EMIs that is not associated with the active instruction pointer to standby.

In still a further embodiment of the invention, generating at least a respective active IIC may comprise including within the active IIC data with respect to one or more possible states of the active IIC, and in association with each one of the one or more states, specifying a data input for triggering of the respective state. In some embodiments, including within the active IIC data with respect to one or more possible states of the active IIC may comprise providing in connection with one or more of the possible states of the active IIC a subsequent active instruction pointer or a subsequent context pointer or a subsequent group of context pointers that is associated with the respective state.

In some embodiments the computer implemented method may also include generating a record for the IIC, the IIC record including at least data related to the predefined user-interaction and/or the predefined system state or event corresponding with the IIC. In some embodiments generating a log for the IIC may further include, recording within the IIC record at least a temporal parameter that is related to at least one temporal aspect of the predefined user-interaction and/or the predefined system state or event corresponding with the IIC.

In still further embodiments, the computer implemented method may also include processing the IIC record to generate information related to the EMI associated with the respective IIC. Processing of the IIC record may include taking into account a parameter or a circumstance associated with the user-interaction and/or with the predefined system state or event corresponding with the respective IIC. In yet further embodiments, processing the IIC record may include generating a temporal prediction based at least on the IIC record and historical or reference data related to the respective IIC record.

In some embodiments, selecting a group of permitted EMIs may include selecting the group of permitted EMIs in accordance with a current user's profile and/or according to predefined configuration rules. The user's profile specifying at least credentials for the respective user. The predefined configuration rules permit or restrict access to certain EMIs from among the subset of EMIs according to the user's profile and/or according to the metadata that is associated with the respective EMIs. In further embodiments, selecting a group of permitted EMIs may include determining the order and hierarchy of the maintenance instructions within the group of permitted EMIs in accordance with the predefined hierarchy and the predefined order according to which the set of EMIs are connected to one another. In still further embodiments, selecting a group of permitted EMIs may include including within the selected group EMIs which, based on the predefined hierarchy and the predefined order, surround, precede or succeed the EMI that is referenced by the active instruction pointer and which are permitted according to the configuration rules and/or based on the user's profile and the access control specification related to the respective EMIs. In yet further embodiments, selecting a group of permitted EMIs may include obtaining a pointer for each EMI in the group of permitted EMIs.

In some embodiments, the computer implemented method may further comprise providing a presentation-specification for enabling rendering on a user-interface IICs associated with the EMIs in the group of permitted EMIs. In some embodiments, providing a presentation-specification may include generating the presentation-specification based on the current context pointer or the current group of context pointers, the current active instruction pointer, and the order and hierarchy according to which the set of EMIs are connected to one another. In further embodiments, the presentation-specification may include data representative of the active IIC generated for the EMI referenced by the active instruction pointer.

In still further embodiments, the presentation-specification, in association with or as part of the data corresponding to the active IIC, includes data representative of a content of the EMI referenced by the active instruction pointer. In yet further embodiments the presentation-specification, in association with or as part of the data corresponding to the active IIC, includes an input field specification for enabling a data input in connection with the active IIC. In yet further embodiments, the input field specification is characterized according to a configuration rule related to input field specification and/or according to respective metadata of the EMI associated with the active IIC.

In some embodiments, with respect to the active IIC, the presentation specification includes a distinguishing presentation feature, to thereby enable distinctive presentation of the active IIC compared to the presentation of the other IICs corresponding to EMIs in the group of permitted EMIs that are not associated with the active instruction pointer. In some embodiments, the data representative of the content of one or more of the IICs corresponding to EMIs in the group of permitted EMIs that are not associated with the active instruction pointer is disabled or removed from the presentation specification.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 2 is an illustrative representation of a collection of EMIs that are part of a set of EMIs constituting the electronic technical documentation;

FIG. 6 is a graphical illustration of one example of a task log which may be generated on an apparatus for providing assistance and control in respect of maintenance operations, according to some embodiments of the invention;

FIG. 7A is a graphical illustration of one example of a data structure which may be used to store various temporal parameters related to certain items of the electronic technical documentation, as part of some embodiments of the invention.

Figure 1:
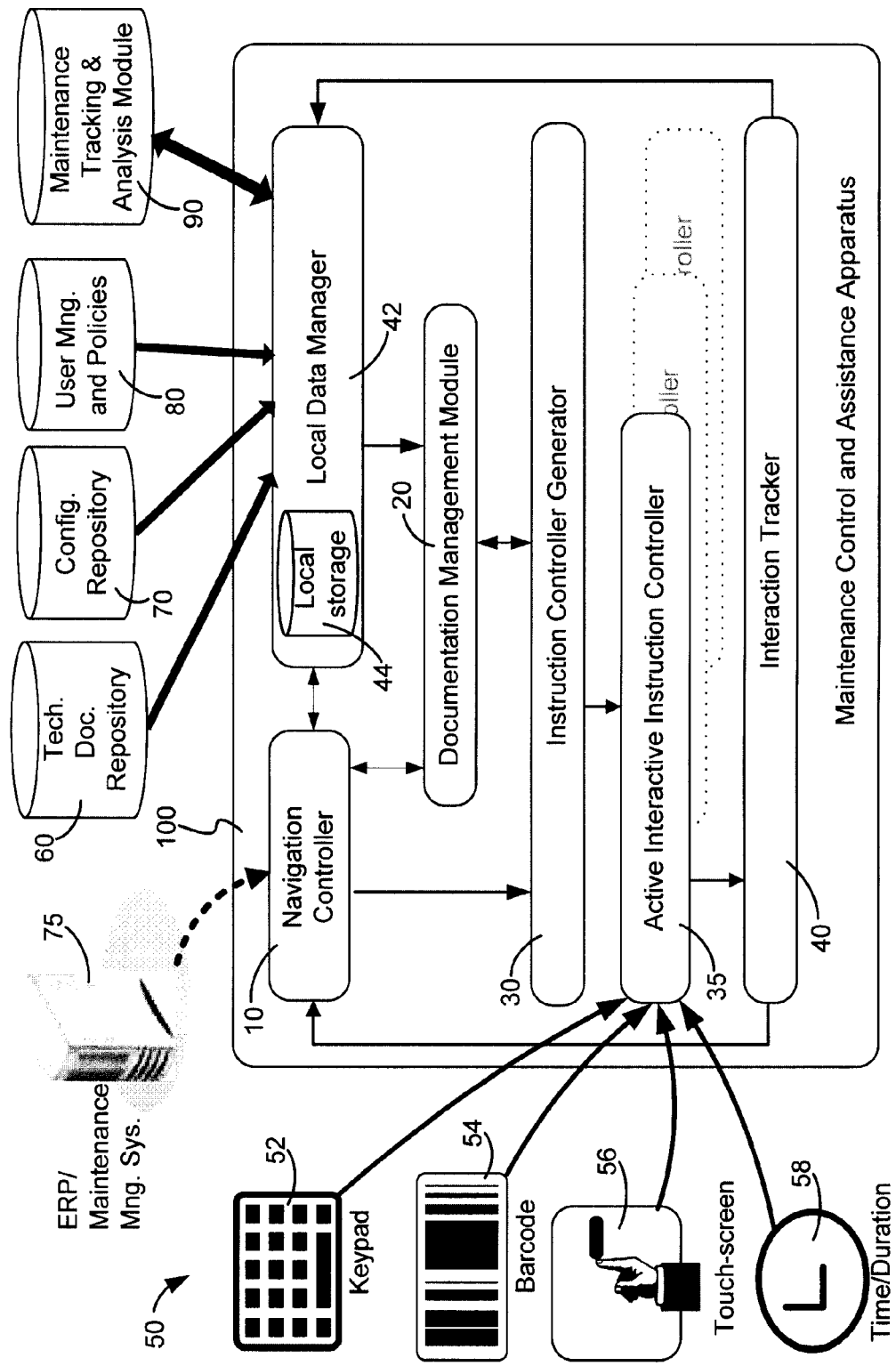
FIG. 1 is a block diagram illustration of an apparatus for providing assistance and control with respect to maintenance operations, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "configuring" or the like, refer to the action and/or processes of a computer that manipulate and/or transform data into other data, said data represented as physical, e.g. such as electronic, quantities. The term "computer" should be expansively construed to cover any kind of electronic device with data processing capabilities, including, by way of non-limiting example, personal computers, servers, handheld computer systems, Pocket PC devices, Cellular communication device and other communication devices with computing capabilities, processors and microcontrollers (e.g. digital signal processor (DSP) possibly in combination with memory and storage units, application specific integrated circuit "ASIC", etc.) and other electronic computing devices.

The operations in accordance with the teachings herein may be performed by a computer specially constructed for the desired purposes or by a general purpose computer specially configured for the desired purpose or for the desired operations by a computer program stored in a computer readable storage medium.

In addition, embodiments of the present invention are not described with reference to any particular programming language. It will be appreciated that a variety of programming languages may be used to implement the teachings of the inventions as described herein.

Throughout the specification and the claims reference is made to the term "electronic technical documentation". Another term to which reference is made throughout the specification and the claims is "electronic maintenance instruction" or EMI in abbreviation (EMIs in the plural form). These terms are now defined. The term "electronic technical documentation" as used herein, relates to any form of structured electronic documentation which includes a set of discrete electronic maintenance instructions which are connected to one another according to a predefined hierarchy and predefined order. Typically, electronic technical documentation includes markup language labels or fields and metadata which surround content. An Electronic Maintenance Instruction (EMI) is the basic structured element to which reference can be made in a specific electronic maintenance documentation. Notwithstanding the above, it would be appreciated that reference can be made to a certain feature or portion of a specific EMI, however, such reference is mostly meaningless without the basic reference to the specific EMI which the feature belongs to. Furthermore, an electronic technical documentation may include other resources in addition to EMIs, such as higher level resource descriptors (e.g., chapter descriptor, book descriptor, electronic technical documentation descriptor), non-EMI references (e.g., technical drawings from a file or table of tools' serial numbers, etc.). Reference to a higher-level resource descriptor may imply reference to all or to a specific subset or group of EMIs which are associated with the respective resource.

An EMI within an electronic technical documentation typically includes some content describing a respective maintenance instruction to be performed. An EMI may also include or may be associated with some indication regarding the respective EMI's place within the predefined order and hierarchy of the electronic technical documentation. The indication regarding the place of an EMI within the predefined order and hierarchy may be provided via appropriate metadata fields and parameters or otherwise, e.g., inferred from the physical position of the code or string associated with the EMI within a certain portion of or within the entire electronic technical documentation. An EMI may also include metadata fields which provide additional data regarding the respective EMIT, including, but not limited to, reference to other resources within the electronic technical documentation, such as technical drawings and other supplementary data, and/or to external resources, such as an external database entry, for example, user credentials associated with the respective EMI, prerequisites, security specification, acknowledgement requirements, etc.

Typically, electronic technical documentation to which the present invention relates, is intended for use as a guide, reference or tool accompanying technical operations such as maintenance or manufacturing, including but not limited to, manufacturer maintenance publications, reference manual, aircraft maintenance manuals (AMM such as Boeing AMM documentation), maintenance instruction set, construction instructions, task cards (such as in use by major Maintenance Repair and Overhaul facilities), root cards, job guides (Job Guide documentation such as in use by the United States Air Force on F-16 aircraft), supplemental maintenance document, service bulletins, fault isolation manuals, work instructions and manufacturing documentation. Such electronic technical documentation may be formatted and/or stored in various ways including but not limited to XML, SGML, Database, HTML, PDF, Microsoft Word, Adobe FrameMaker and Simple ASCII or Unicode Text files.

Some embodiments of the present invention relate to a method, a system and an apparatus for providing assistance and control functions with respect to maintenance operations. The maintenance operations are based on electronic technical documentation which prescribe a set of electronic maintenance instructions (hereinafter "EMI" for a singular electronic maintenance instruction and "EMIs" for the plural form of the term). The set of EMIs is comprised of a plurality of discrete EMIs which are connected to one another according to a predefined hierarchy and predefined order. There are various examples of electronic technical documentation which include a plurality of discrete EMIs that are connected to one another according to a predefined hierarchy and order. One example of such electronic technical documentation is SGML based Job Guide documentation for the Lockheed Martin F-16 Aircraft. Further by way of example, a maintenance provider may generate its own technical documentation or may adapt existing files.

Reference is initially made to FIG. 2 which is an illustrative representation of a collection of EMIs that are part of a set of EMIs constituting the electronic technical documentation. In FIG. 2 the technical documentation includes one or more books, which in turn each include one or more chapters and each chapter includes one or more EMIs.

At its topmost level, the electronic technical documentation includes a documentation descriptor 210 which includes the basic, high-level set of details of the electronic technical documentation. For example, in FIG. 2, the documentation descriptor 210 may include a name corresponding to the current electronic technical documentation, which, in this example, is named "Silverlight CLASS B AIRCRAFT" (this is a factionary aircraft and is referenced here as an example). At the next hierarchical level, the electronic technical documentation provides descriptors for each one of a plurality of different books which are part of the current electronic technical documentation, namely which are part of the aircraft maintenance manual. For convenience, in FIG. 2, there is provided an illustration of one such book descriptor, namely book descriptor 220. The book descriptor 220 may include as content or attribute field the name of the book, in this case the attribute field of the book descriptor 220 contains the string "O-LEVEL MAINTANANCE MANUALS", and possibly other types of information. According to some embodiments, the book descriptor 220 may include certain metadata which may provide additional information or parameters related to the respective book. For example, the metadata may include: the equipment make, model and revision, qualifications required from maintenance personnel, an alphanumeric reference ID, an access control specification, etc.

In a similar manner, under a book there may be one or more chapters. In FIG. 2, there is shown a descriptor 230 for the chapter "PREFLIGHT" which is one chapter of the book "O-LEVEL MAINTANANCE MANUALS". The book "O-LEVEL MAINTANANCE MANUALS" may have other chapters in addition to the chapter "PREFLIGHT". According to some embodiments, each chapter descriptor 230 may include an attribute field which may hold the name of the chapter, and possibly additional information. According to further embodiments a chapter descriptor 230 may also include metadata which may provide further information or parameters which are related to the chapter associated with the descriptor 230. At the next hierarchical level, the electronic technical documentation provides descriptors for each one of a plurality of different sections which are part of the current chapter. In FIG. 2, the chapter "PREFLIGHT" includes five section descriptors 240A-240E which denote five respective sections of this chapter, namely "PRECONDITIONS", "TOOLS", "MATERIALS", "DISCONNECT MAIN POWER FEED" and "INSPECT LANDING GEAR".

On the next level of the hierarchical scheme, each section may include one or more EMIs 250. In FIG. 2 there are many EMIs, each EMI is designated by an encapsulating label pair <unit> and </unit>. For convenience purposes, the numeral 250 is used to collectively represent all the EMIs shown in FIG. 2. Each one of the EMIs 250 may be correlated with a basic maintenance operation. Each one of the EMIs 250 may include a content field or attribute which may hold the content of the respective EMI, typically the technical description of the respective maintenance operation, and possibly other data. According to some embodiments, some or all of the EMIs 250 may also include metadata. The metadata of a certain EMI may hold a variety of features and parameters which are related to the EMI. Some examples of features and/parameters which may be provided within the metadata of a certain EMI and which may be used to augment the EMI, include but are not limited to: a value (or some other identifier) which specifies the EMI's location within a certain collection of EMIs, for example, among the EMIs which belong to a certain chapter or section; a completion sign off parameter indicating the type of signature or user interaction required in order to regard the EMI as complete; an access control specification which specifies the identity or the type of users which may be permitted or denied access to the EMI; an alert specification which specifies an alert that is to be raised (possibly under certain circumstances); a mandatory instruction flag, which specifies that the current EMI is mandatory and cannot be skipped; a reference to a certain resource which may be accessed within the context of the current EMI (a technical drawing for example); style definitions to be used for determining the appearance of the EMI when displayed on screen; an input field specification for specifying an input area which may be generated in association with the EMI and require users to insert a value that will be collected; a reference code pointing to another EMI enabling non linear navigation within the electronic technical documentation; a reference link pointing to a local or remote file such as HTML or PDF.

It would be appreciated that the hierarchical scheme described above and shown in FIG. 2 is one example of the manner by which the EMIs may be organized and that various electronic technical documentation may set forth various other hierarchization and order schemes. Alternative hierarchization and order schemes may be based, for example, on the order by which the various EMIs and other items of the electronic technical documentation (books, chapters, etc.) are listed and the indentation of each item, or in another example, a certain electronic technical documentation may prescribe an hierarchization and order scheme which is based on explicit data which may be included within the metadata of each item (books, chapters, EMIs, etc.)

Furthermore, it would be appreciated that by definition, an EMI may include any item of an electronic technical documentation which provides a maintenance instruction, and thus EMIs may be found at more that one level of a certain hierarchical scheme. For example, a certain chapter or a certain section of a chapter may include one or more high-level instructions that are located one level below the chapter/section in the hierarchical scheme. Each high-level instruction is associated with a respective EMI that is located at a first level of the hierarchical scheme. The high-level instruction(s) may include one or more mid-level instructions that are located one level below the respective high-level instruction in the hierarchical scheme. Each mid-level instruction may be associated with a respective EMI. And one or more of the mid-level EMIs may include one or more low-level instructions that are located one level below the respective mid-level instruction in the hierarchical scheme. Each low-level instruction may be associated with a respective EMI. It would be appreciated, that the instructions at any level may be considered as EMIs and may be handled in a similar manner. However in further embodiments, the hierarchical level of the instructions may be significant, as will be described in further detail below.

Reference is now made to FIG. 1 which is a block diagram illustration of an apparatus for providing assistance and control with respect to maintenance operations, according to some embodiments of the invention. According to some embodiments, the apparatus 100 for providing assistance and control with respect to electronic maintenance operations may include a navigation controller 10, a documentation management module 20 and an instruction controller generator 30. The documentation management module 20, the instruction controller generator 30 and the navigation controller 10 may be operatively interconnected. The navigation controller 10 may be adapted to provide a context pointer or a group of context pointers referencing one or more respective EMIs from the set of EMIs provided by the technical documentation. The context pointer or pointers may indicate a subset of EMIs from among the set of EMIs which constitute a current context within the electronic technical documentation and within the corresponding set of EMIs.

The documentation management module 20 may be adapted to obtain EMIs and other items of the electronic technical documentation from internal and/or external repositories. In some embodiments, the documentation management module 20 may obtain EMIs which correspond with the current context, and are based on the current context pointer or pointers. For example, the documentation management module 20 may obtain all the relevant data within the electronic technical documentation that is associated with the EMIs which constitute the current context. The documentation management module 20 may be configured to receive the context pointer or pointers from the navigation controller 10. Alternatively the documentation management module 20 may receive an indication with respect to each one of the EMIs in the subset of EMIs which constitute the current context within the electronic technical documentation.

In some embodiments, the documentation management module 20 may also be adapted to select a subset of EMIs which constitute a group of permitted EMIs within the current context. The group of permitted EMIs may be selected from amongst the set of EMIs which constitute the current context. In further embodiments, the selection of the group of permitted EMIs may be performed by the navigation controller 10, rather than by the documentation management module 20. For convenience, in the following description, by way of non-limiting example, the selection of the group of permitted EMIs is assigned to the documentation management module 20. The selection of a certain EMI to the group of permitted EMIs (or the removal of a certain EMI from the group) shall be described in further detail below.

The navigation controller 10 may receive an indication with respect to which EMIs from the subset of EMIs constituting the current context remain in (or were removed from) the group of permitted EMIs (or may generate the group of permitted EMIs itself), and the navigation controller 10 may select an active instruction pointer which references a current active EMI from among the group of permitted EMIs. For example, according to some embodiments, whenever a new group of permitted EMIs is determined, the navigation controller 10 may be adapted to select the first EMI from the group of permitted EMIs. It would be appreciated that the first EMI is the EMI located, according to the predefined order by which the EMIs are connected to one another, at the top of the list of EMIs in the group of permitted EMIs. However, in further embodiments, the navigation controller 10 may be otherwise adapted to select the initial active instruction pointer upon selection of the group of permitted EMIs.

By way of example, the navigation controller 10 may obtain the content and metadata of the EMI referenced by the active instruction pointer from the documentation management module 20. As was mentioned above in brief, and will be described in further detail below, the documentation management module 20 may obtain certain EMIs, including content and metadata of the EMIs from local or remote storage. For example, the documentation management module 20 may obtain EMIs which constitute the current context. In a further embodiment, the documentation management module 20 may obtain EMIs which constitute the group of permitted EMIs within the current context. In some embodiments, the navigation controller 10 may further process the EMIs received from the documentation management module 20, for example, based on user profiles and/or configuration rules, as will be discussed in further detail below.

The navigation controller 10 may provide the instruction controller generator 30 with the active instruction pointer, and the instruction controller generator 30 may be responsive to the active instruction pointer for generating a respective active interactive instruction controller (hereinafter "IIC" is used as an acronym for interaction instruction controller, and "active IIC" for the interactive instruction controller in the active state) 35; or the instruction controller generator 30 may be responsive to the active instruction pointer for generating a respective active IIC specification for enabling generation of a respective active IIC 35. For convenience, the instruction controller generator is described throughout the description and the claims as a generator of an active IIC. An IIC, and in particular an active IIC, is a data structure which may include components, such as interactive GUI controls, logic, data and event listeners. As described in further detail below, the components of an IIC, and in particular of an active IIC, are based on a respective EMI from the electronic technical documentation and possibly based on other sources, some of which are described below.

According to some embodiments, together with the active instruction pointer, or in association therewith, the instruction controller generator 30 may receive from the navigation controller 10 a content and metadata specification which are related to the EMI referenced by the active instruction pointer. The content of the respective EMI and the metadata may be used by the instruction controller generator 30 in generating the active IIC 35, as will be described in further detail below. The content and metadata specification provided for the EMI referenced by the active instruction pointer may be based on the respective content and metadata of the EMI referenced by the active instruction pointer. In further embodiments, the content and metadata of the EMI referenced by the active instruction pointer may be adapted and processed by the navigation controller 10, and the instruction controller generator 30 may receive as input a processed version of the content and metadata of the EMI referenced by the active instruction pointer. Various embodiments of the invention related to the processing of content and metadata of an EMI, shall be discussed below.

According to some embodiments, the instruction controller generator 30 may include within an active IIC 35 a content field. The instruction controller generator 30 may put within the content field of an active IIC 35 content which corresponds to the content of the respective EMI referenced by the active instruction pointer. The instruction controller generator 30 may include further information or adapt the information in the content field of an active IIC 35 according to information from other sources and/or in accordance with a predefined specification or rules that may be implemented by the instruction controller generator 30 or by any other components of the apparatus 100, as will be explained in further detail below. In a similar manner the instruction controller generator 30 may include certain indications or data within various metadata fields of an active IIC 35. The metadata of an active IIC 35 may be generated based on the metadata of the EMI referenced by the active instruction pointer or based on data obtained from other sources or based on predefined rules or a predefined specification implemented by the instruction controller generator 30 or by any other components of the apparatus 100.

According to further embodiments, the instruction controller generator 30 may include within the active IIC 35 (or within the active IIC specification) a software component that is sensitive to a predefined user-interaction and/or to a predefined system state or event corresponding with the active IIC 35. In some embodiments, the instruction controller generator 30 may determine the sensitivity for a particular active IIC 35, and render it sensitive to a particular user-interaction or to a certain system state or event, according to some indication in the metadata of the respective EMI referenced by the active instruction pointer. According to further embodiments, either as an alternative or in addition to the indication in the metadata, the instruction controller generator 30 may determine the sensitivity for a particular active IIC 35 according to a specification or indication received from a source external to the particular EMI, and possibly from a source that is external to the electronic technical documentation. As an example, an active IIC may be configured to switch off its sensitivity to user interaction in relation to the availability of an overriding hardware input device. In another example, the active IIC may be configured to extend its on-screen sensitivity area, based on receiving a range of values from a light sensor indicating the intensity of surrounding lighting.

According to still further embodiments, either as an alternative or in addition to the indication provided by any of the above sources, the instruction controller generator 30 may determine the sensitivity for a particular active IIC 35 according to a predefined rule or specification implemented by the instruction controller generator 30. By way of example, the predefined rule or specification may be user-centric and different default settings or rules may be implemented with respect to different users or with respect to different groups of users. However, in further embodiments, the responsibility of implementing the various rules and specifications for adapting the original EMI may be assigned, at least in part, to the navigation controller 10 and the instruction controller generator's 30 responsibly may be restricted to the interpretation of the data received from the navigation controller 10 to generate a corresponding event sensitive software controller. In still further embodiments, processing of the original EMI may be split among the instruction controller generator 30 and the navigation controller 10.

As mentioned above, the instruction controller generator 30 may include within the active IIC 35 (or within the active IIC specification) a software component that is sensitive to a predefined user-interaction and/or to a predefined system state or event corresponding with the active IIC 35. For example according to some embodiments, the instruction controller generator 30 may include within the active IIC 35 an event handler (one or more) and possibly an associated subroutine and/or a reference or a pointer which are triggerable or invokable by the predefined user-interaction and/or by the predefined system state or event corresponding with the active IIC 35. Thus, when the predefined user interaction, system state or event is detected, or when an indication with respect thereof is received, the active IIC 35 may trigger the subroutine associated with the event handler and/or the pointer associated with the event handler. According to further embodiments, the active IIC 35 may be sensitive to a plurality of user interactions and/or system states or system events (one or more of each), and the active IIC 35 may include a distinct event handler and/or a distinct subroutine that is sensitive to a respective one of the predefined user-interactions, system states or events corresponding with the active IIC 35.

According to further embodiments, the instruction controller generator 30 may include within the active IIC 35 (or within the active IIC specification) an input field (or an input field specification). The input field may be configured to enable a data input in connection with the active IIC 35. The input field may be generated according to the metadata that is contained within (or otherwise corresponding with) the EMI referenced by the active instruction pointer with which the active IIC 35 is associated; or in addition or as an alternative to the metadata, the input field may be generated according to a predefined policy implemented by the apparatus 100. The implementation of certain policies within the apparatus 100 shall be discussed in further detail below.

According to some embodiments of the invention, the apparatus 100 may include or may be associated with various user interface modules and application interface modules (e.g., an application programming interface or in abbreviation API) which are collectively referenced by the numeral 50. There are various user interface modules which may be used in conjunction with the proposed apparatus 100 and some embodiments of the invention are not restricted to any particular interface or collection of interfaces. By way of example, in FIG. 1 there is provided a number of examples of user interface modules including: a keypad 52 which may be operated by a user to type or select and thereby generate corresponding information that may be input to the apparatus 100; a barcode scanner 54 which may be used to scan a barcode of an item and input the scanned code to the apparatus 100; and a touch screen pad 56 which may be operated by a user to make a selection or otherwise input data therethrough to the apparatus. Also shown in FIG. 1 by way of example is a link between an active IIC 35 and a clock and timing module 58 which may be configured to provide time and duration information to the apparatus 100. However it would be appreciated that the apparatus 100 may include an internal clock and an integrated timing module and that the active IIC 35 may implement an API or some other interface to obtain time and timing information from the integrated clock and timing module of the apparatus 100. In a similar manner, an active IIC 35 may obtain information with respect to other system states or events.

The active IIC 35 may be configured to switch to a certain state in response to a predefined user-interaction and/or to a predefined system state or event corresponding with the active IIC 35. According to some embodiments, the active IIC 35 may be responsive to a predefined user-interaction and/or to a predefined system state or event corresponding with the active IIC 35 for switching its state to a predefined state that is related to the predefined user-interaction and/or to the predefined system state or event. Thus, for example, different states of an IIC, including the active state and the complete state, may be associated with different user interaction(s), system state(s) or system event(s) and may be triggered only in response to the respective user interaction(s), system state(s) or system event(s).

According to some embodiments, the apparatus 100 may further include an interaction tracker 40. According to some embodiments, the interaction tracker 40 may be adapted to detect that a state of an IIC has been switched, in particular that an active IIC 35 has been switched to a different state. The interaction tracker 40 may be responsive to detecting that the state of a certain IIC has changed for providing an indication and possibly triggering the generation of a record or of a communication related to the change. For example, the interaction tracker 40 may include in its record a reference to the IIC whose state has changed and optionally (in particular if there are more than two possible states) an indication of the new state of the IIC.

It would be appreciated that the interaction tracker 40 may include additional information in the record/communication related to the IIC, related to the state change and/or related to the predefined user-interaction and/or to the predefined system state or event corresponding with the IIC which triggered the state change. According to further embodiments, the interaction tracker 40 may serve other purposes and provide information to other clients or modules within the apparatus 100 as well as to external clients/modules/entities as will be described in more detail below.

According to some embodiments, when it is detected that (or when an indication is received by the active IIC 35 or the interaction tracker 40 with respect of) a certain predefined user-interaction and/or a certain predefined system state or event had corresponded with the active IIC 35, and as a result, the state of the active IIC 35 was altered, a selection of the next active instruction pointer or the next context pointer may be triggered. According to some embodiments, the selection of the subsequent active instruction pointer or of the subsequent context pointer may be triggered by the IIC 35 state change. For example, when the state of a certain active IIC 35 changes from an active state to a completed state, a process for selecting a subsequent active instruction pointer may be invoked.

According to one embodiment, the selection of the subsequent active instruction pointer may be carried out by the navigation controller 10 which may indicate the next active instruction pointer to the instruction controller generator 30. For example, in case a dedicated navigation button is pressed by the user, the state of the current active IIC 35 may switch to 'idle' and an indication regarding the user's selection may be generated by the interaction tracker 40 and the indication may be received by the navigation controller 10. The navigation controller 10 may determine which EMI within the current context or within the group of permitted EMIs is associated with the user's selection and may instruct the instruction controller generator 30 to generate or activate the IIC associated with the EMI. In further embodiments, the instruction controller generator 30 may receive from the context navigation controller 10 a predefined sequence or several predefined sequences for a certain collection of EMIs (subset constituting the current context; group of permitted EMIs; or some portion of the subset or group) and within the current collection of EMI, the instruction controller generator 30 may select a subsequent active instruction pointer according to the predefined sequence or according to one of the predefined sequences. For example, a predefined sequence provided by the navigation controller 10 may specify a subsequent active instruction pointer in respect of each EMI in the collection, and for any possible state of each EMI in the collection, thereby enabling the instruction controller generator 30 to determine the subsequent active IIC following completion or other state alternation of the current active IIC. In yet further embodiments, the predefined sequencers) and dynamic selection by the navigation controller 10 may coexist, for example, by implementing a predefined sequence or sequences as default and overriding in certain cases (e.g., a user browsing outside the sequence). Further embodiments of the invention, which relate to the manner by which a subsequent active instruction or a subsequent context pointer may be selected, shall now be described.

Figure 3:
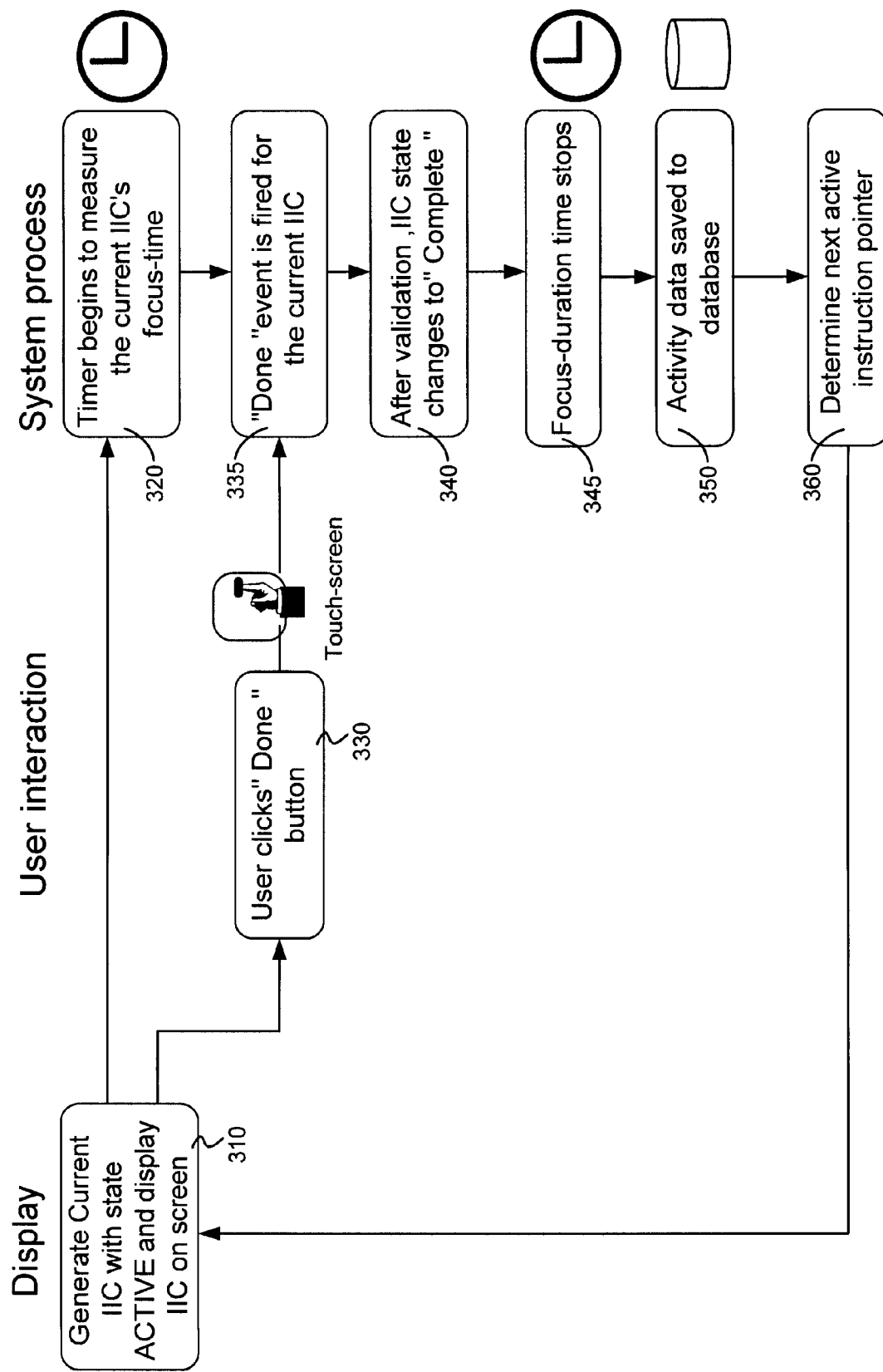
FIG. 3 is a flow-diagram of one series of events which may occur during the lifecycle of a certain active IIC, leading to the selection of a subsequent active IIC.

A further perspective of a certain series of events related to the lifecycle of a certain IIC is provided with reference to FIG. 3. FIG. 3, to which reference is now made, is a flow-diagram of one series of events which may occur during the lifecycle of a certain active IIC, leading to the selection of a subsequent active IIC. It would be appreciated that events illustrated in FIG. 3 constitute one (relatively basic) implementation of the invention, and is hereby provided for illustration purposes and that various other implementations, some of which were already described above, may exist.

The flow diagram begins with the activation of an IIC (block 310). The current active IIC includes an event handler that is responsive to a user clicking a certain area of a touch-sensitive screen (or pressure-sensitive screen) for altering the state of the IIC to a completed state. At the instant the current IIC is activated, or substantially immediately thereafter, a system process which counts the total accumulated time in which the IIC has been active, or the time during which the IIC has been active from its most recent state change (i.e. non-accumulated time), is invoked (block 320). One or both of these temporal parameters is/are sometimes referred to herein as the "focus-time" for the respective IIC.

Some time after the IIC is activated, for example, after the user has read the content of the active IIC and has performed the corresponding maintenance instruction, the user may click the area of the touch-sensitive screen that is designated for a user input indicating that the maintenance instruction associated with the current active IIC is complete (block 330). In response to the user input a respective event handler of the IIC is invoked (block 335), resulting in the state of the current active IC being altered to a complete state (block 340). In conjunction with the switching of the state of the IIC to a complete state, the IIC may also cause the system process responsible for measuring the duration of time during which the state of the IIC is active to halt (block 345) and provide an indication with respect to the measured time period. Certain data with respect to the IIC may be recorded within a data repository, such as in a database, for example (block 350). The record associated with the IIC may include, for example, an identifier of the respective EMI, the user interaction or system state or event which triggered the state transition, the state(s) of the IIC, the focus time for the IIC, etc. Finally, the next active instruction pointer is determined (block 360) and the next IIC is activated.

As will be described below, the subsequent active instruction pointer may be determined in accordance with a predefined sequence that is enforced at the group of permitted EMIs level, at the context level or at a higher level (e.g., the EMIs within a certain chapter must be carried out at a specific order); or the subsequent active instruction pointer may be determined in accordance with a user selection; or the subsequent active instruction pointer may be determined in accordance with the user-interaction and/or the system state or event triggering the state change (e.g., several sub-sequences are possible, or the sequence is dynamically generated).

According to some embodiments, a subsequent context pointer or pointers may be selected when the entire subset of EMIs which constitute the current context is complete or when the IICs corresponding to the entire subset of EMIs which constitute the current context are complete. According to further embodiments, a subsequent context pointer or pointers is selected when the entire group of EMIs which includes the permitted EMIs within the current context is complete or when the IICs corresponding to the entire group of EMIs which includes the permitted EMIs within the current context are complete. The next context pointer may be selected according to the predefined order and hierarchy by which the various items of the electronic technical documentation are connected to one another; or the next context pointer may be otherwise selected, for example, according to an instruction from an external source or according to a predefined maintenance work plan provided by a dispatch relay module or by a maintenance management system 75, such as a resource planning ("ERP") system, for example. In a further embodiment, the next context pointer may be selected according to the state of the IIC 35 which concludes the current context or the permitted group EMIs within the present context; and/or the next context pointer may be selected according to the user-interaction and/or the system state or event triggering the state change.

Various embodiments, which relate to the enforcement of a predefined sequence of EMIs shall now be discussed. For convenience, in the following description the responsibility for selecting a subsequent active instruction pointer is assigned to the instruction controller generator 30. However, as mentioned above the selection of the subsequent active instruction pointer may be carried out by the navigation controller 10, which may preprogram the sequence(s) of active instruction pointer selection into the data with respect to a collection of EMIs that is provided to the instruction controller generator 30 (collection includes the aforementioned subset or group), or which, in particular predefined cases, may override a predefined sequence (provided by the navigation controller 10 or generated by the instruction controller generator 30) and may communicate the subsequent active instruction pointer to the instruction controller generator 30. All of the above implementations may be readily applied to the embodiments of the invention discussed in the following description. As was mentioned above, one or more predefined sequences of EMIs may be implemented by the instruction controller generator 30 and a subsequent active instruction pointer may be determined in accordance with the predefined sequence, possibly in combination with additional information from other sources.

In some embodiments, the additional information which may influence the process of determining a subsequent active instruction pointer, may include, but is not limited to, the predefined user interaction or the system state or event associated with the triggering of the process of determining the subsequent active instruction pointer, and/or the state of the current active IIC 35 following the processing of the predefined user interaction or the system state or event that triggered the process of determining the subsequent active instruction pointer. According to further embodiments, in case there is more than one predefined sequence that the instruction controller generator 30 is configured to implement, the additional information may be used to select the appropriate sequence among the plurality of predefined sequences. According to still further embodiments, the instruction controller generator 30 may also be adapted to override the one or more predefined sequences based on an additional input.

In one example, the instruction controller generator 30 may be configured to strictly force the user to follow a predefined sequence of EMIs and to access or complete the respective IICs according to the predefined sequence in order to conclude a certain collection of EMIs. The sequence may relate to the subset of EMIs which constitute the current context within the electronic technical documentation, or in another example, the sequence may relate to the group of EMIs which constitute the permitted EMIs within the subset of EMIs which constitute the current context. In a further example the sequence may relate to a collection of EMIs which constitutes some portion of the aforementioned subset or group. The sequence may come in many forms including a predefined scheme, a list, table or file containing an entry for each EMI in the collection and indicating the predefined sequence, or a predefined set of rules which can be used to generate the sequence of EMIs.

As was mentioned above, according to one sequencing approach, the user may be strictly forced to follow the sequence of EMIs and to access or complete the respective IICs according to the predefined sequence in order to complete the current context, For example, with reference to FIG. 2, in order to complete the section "PAGE 2: INSPECT LANDING GEAR", assuming that there is no access specification preventing the current user from accessing any of the EMIs in this chapter, the user may be required to complete each one of the IICs generated for the EMIs in the section in a sequence which is based on the predefined order by which the relevant EMIs are connected to one another within the electronic technical documentation.

In further embodiments, the apparatus may be adapted to introduce various degrees of flexibility with respect to the predefined sequence of EMIs that is prescribed by the predefined order and hierarchy by which the EMIs and other items of the electronic technical documentation are connected to one another. The level of flexibility may range from very light restrictions in which, for example, the user may be required to access or complete some of the IICs generated for the EMIs within a certain collection (e.g., a group or a subset) of EMIs by any order selected by the user, through a more strict approach which may allow the user to access only certain resources (such as technical drawings or associated IICs referenced by a certain IIC in the sequence) outside the predefined sequence, and concluding with a completely rigid approach according to which the user cannot deviate in any way from the predefined sequence. A different level of flexibility may be implemented with respect to different users. Adapting various aspects of the operation of the apparatus 100 per different users shall be described in further detail below.

Having described some embodiments which relate to various sequencing approaches that may be implemented by the instruction controller generator 30 to determine a subsequent active instruction pointer, there is now provided a more detailed description of certain embodiments of the invention which relate to sequencing approaches that are sensitive to various inputs, and that may be configured to adapt the selection of a subsequent active instruction pointer according to certain inputs. For example, in some embodiments, as part of replacing a current active IIC 35 with a subsequent active IIC, the process of determining the subsequent active instruction pointer may be sensitive to a reference or a pointer which may be provided by the current active IIC 35. According to some embodiments, the reference or pointer provided by the current active IIC 35 may be used to override a default sequence. In further embodiments, the sequencing approach implemented within the apparatus 100 (e.g., by the navigation controller 10) may allow non-constrained browsing (free-browsing), and the instruction controller generator 30 may rely on the references provided by the active IICs to determine the subsequent active IICs. In still further embodiments, a midway approach may be implemented, and the references provided by the active IICs may be used, in some cases, to select among two or more possible subsequent active instruction pointers.

According to some embodiments, the event handler implemented within a current active IIC 35 may be involved in the process of selecting a subsequent active IIC. As was mentioned above, an event handler of a certain active IIC 35 may be triggerable by a predefined user-interaction and/or by the predefined system state or event corresponding with the active IIC 35, The event handler may include a reference or a pointer that may indicate a subsequent active instruction pointer that should be invoked in connection with the event handler. When the event handler is triggered (by the predefined user-interaction and/or the predefined system state) and the active IIC 35 switches to a certain state (other than 'active'), the pointer within the event handler may be invoked and may provide the subsequent active instruction pointer. Based on the active instruction pointer from the previous active IIC, the current active IIC 35 may be generated or activated. The now active IIC is based on the EMI associated with the active instruction pointer referenced by the event handler in the previous active IIC.

In an alternative implementation, the event handler of a current active IIC 35 may be associated with two or more different subroutines and each of the two or more subroutines may be associated with a particular user interaction and/or a particular system state or event corresponding with the active IIC 35. Each one of the two or more subroutines may be configured to invoke a different state of the currently active IIC 35 and each state may be associated with a different subsequent active instruction pointer. Thus, when two or more sequences are possible, the active IIC 35 and in particular the event handler implemented therein may enable selection of a particular one sequence within the current context.

As mentioned above, the instruction controller generator 30 may receive from the navigation controller 10 data related to a certain collection of EMIs (examples of collection include subset constituting the current context; group of permitted EMIs; or some portion of the subset or group). In some embodiments, the navigation controller 10 may provide the instruction controller generator 30 with all the data necessary to generate for each one of the EMIs in the collection of a respective IIC. In further embodiments, the instruction controller generator 30 may generate the IIC for each one of the EMIs in the collection in advance and before the active instruction pointer associated with each one of the respective EMIs is invoked, for example substantially immediately upon receipt of the data from the navigation controller 10. The instruction controller generator 30 may initially set all the IICs generated for each one of the EMIs in the collection in a 'non-active' or 'standby' state, except for one IIC that is set to the 'active' state. The initial active IIC 35 is the one associated with an EMI referenced by an initial active instruction pointer. The initial active instruction pointer may be received from the navigation controller 10 as part of the data regarding the collection of EMIs.

Having discussed in some detail various embodiments of the invention which relate to the process of determining a subsequent active instruction pointer and a subsequent active IC, and the implementation of various sequencing approaches, there is now provided a discussion which relates to various interactions between an apparatus for providing assistance and control functions with respect to maintenance operations according to some embodiments of the invention, and external data sources. It should be appreciated however, that in further embodiments, some or all of the data residing on the external data sources described below may be locally stored within the apparatus, for example, on a hard disk drive (HDD) or in another example on a solid state drive (SSD) or on any other suitable storage medium.

In accordance with some embodiments, the electronic technical documentation consisting of the full set of EMIs and other items, such as book and chapter descriptors, or at least some relevant portion of the EMIs and other items, may reside on an electronic technical documentation repository 60. As an example, the electronic technical documentation on the technical documentation repository 60 may be obtained "as is" or with some modifications from a third party content provider. Possible modifications may include, but are not limited to, changes to the content of certain EMIs or other items of the electronic technical documentation, addition of certain EMIs or of other items of the electronic technical documentation, and addition or modification of metadata fields for certain EMIs.

The electronic technical documentation may be stored in any known form including database tables, and files for example. In some embodiments, the electronic technical documentation repository 60 may be an integral part of the apparatus 100; or in further embodiments the electronic technical documentation repository 60 may be implemented as an external entity which is in communication with the apparatus 100 and possibly with other clients as well. For example, the electronic technical documentation repository 60 may be implemented as a remote database server, and may act as a documentation management and publishing platform, possibly in combination with a content management system (CMS) (not shown).

In further embodiments, the apparatus 100 may further be associated with (or include) a user management and policies repository 80. The user management and policies repository 80 may include various configuration rules and configuration parameters which are related to specific users' needs or credentials and/or parameters such as qualifications levels, authorization level, personal preferences etc. The configuration rules or parameters provided by the user management and policies repository 80 may enable implementation of changes with respect to the content or metadata of certain EMIs or other items of the electronic technical documentation. The configuration rules or parameters provided by the user management and policies repository 80 may relate to a specific individual user or to various groups of users and possibly also to all the users. Further configuration rules and configuration parameters may relate to different types of devices on which the apparatus 100 may be implemented. Still further configuration rules and configuration parameters may relate to operating conditions and may enable to adapt the content or metadata of certain EMIs or other items of the electronic technical documentation according to the current operating conditions. In one example a configuration rule may include an instruction level specification. An instruction level specification may specify that a certain user (or users) is required to be presented with sub-level instructions. An instruction level specification may possibly also require that the user interact with the presented sub-level instructions to indicate due attention to the associated instruction, as opposed to other users, e.g., senior engineers who are not required to follow lower-level instructions. In another example, a configuration rule may include required access credentials level; or required user's qualifications; or required user's skill set. In yet another example, a configuration rule may include authentication and authorization specifications, such as, requirement for sign-off per each EMI completed; or requirement for sign-off at a context level only, etc. In still a further example a configuration rule may include the size of font to be used; or various accessibility parameters (increase contrast of display, etc.)

According to some embodiments of the present invention, the apparatus 100 may further be associated with (or include) a configuration repository 70. The configuration repository 70 may include various maintenance configuration rules which may be used to adapt the electronic technical documentation, for example, in accordance with an organization's internal maintenance policies. The configuration rules provided by the configuration repository 70 may relate to a certain user or to a certain group of users having a common characteristic and/or to certain items of the electronic technical documentation, e.g., to EMIs that are associated with a certain metadata value. In a further example, the configuration repository 70 may set forth a configuration rule according to which junior maintenance engineers are required to obtain a signature of a senior maintenance engineer at the end of each chapter, before being allowed to proceed to the next subset or group of EMIs. Yet another example of a configuration rules may be the timing of each IIC, from activation to completion.

The maintenance configuration rules provided by the configuration repository 70 and/or the user management and policies repository 80 may be updated from time to time. In some embodiments, the configuration repository 70 and/or user management and policies repository 80 may be external to the apparatus 100 and the configuration rules or parameters may be provided to the apparatus 100 over a network connection, for example, using push or pull communication modes.

A maintenance management module/system or an Enterprise Resource Planning (ERP) system or a dispatch system 75 may be adapted to provide maintenance assignments or tasks for the apparatus. Throughout the description and the claims any of: a maintenance management module/system, an Enterprise Resource Planning (ERP) system, a Dispatch Module/System, a Maintenance Resource Management, Maintenance Resource Planning, and Production and Assembly Line Management System, are used interchangeably. The maintenance assignments may include a reference, such as a pointer or pointers, to certain items of the electronic technical documentation which are related to the task being assigned. For example, in one embodiment, the maintenance management module 75 may provide a context pointer or context pointers for a certain task, and may thus enable the apparatus 100 to provide assistance and control in respect of at least some of the EMIs within the context specified by the maintenance management module 75, as was described above in detail. The references to the electronic technical documentation items may be provided via manual input by a user (e.g., an administrator) or may be determined automatically based on some logic and parameters. For example, the maintenance management module 75 may be adapted to issue a "PRE-FLIGHT INSPECTION" assignment including references to the appropriate items of the electronic technical documentation based on an input from an ERP system, for example, based on an indication that a certain aircraft is scheduled for flight at a certain time. The maintenance management module 75 may be adapted to automatically determine what references are associated with a certain task or the references may be provided, or predefined manually by a user. The maintenance management module 75 may be operatively connected to the electronic technical documentation repository 60.

In some embodiments, the maintenance management module or ERP 75 may assign a certain user or a certain group of users to perform a certain maintenance assignment(s) or task(s) that is to be issued by the maintenance management module 75. A maintenance task may include a reference to a certain person or a group of persons that are to be assigned for that task. In a further embodiment, once a person (or a group of persons) logs on to the apparatus 405, the apparatus 405 may be adapted to attempt to obtain tasks assigned to that person (or to that group of persons). This option is described now in further detail with reference to FIG. 4. Once the task is received by an apparatus 100 according to the present invention, the task is processed and IICs including an active IIC are generated to provide the user utilizing the apparatus 100 with assistance at the discrete EMI level, and for enabling control and monitoring of various aspects of the maintenance work at the discrete EMI level and above.

Figure 4:
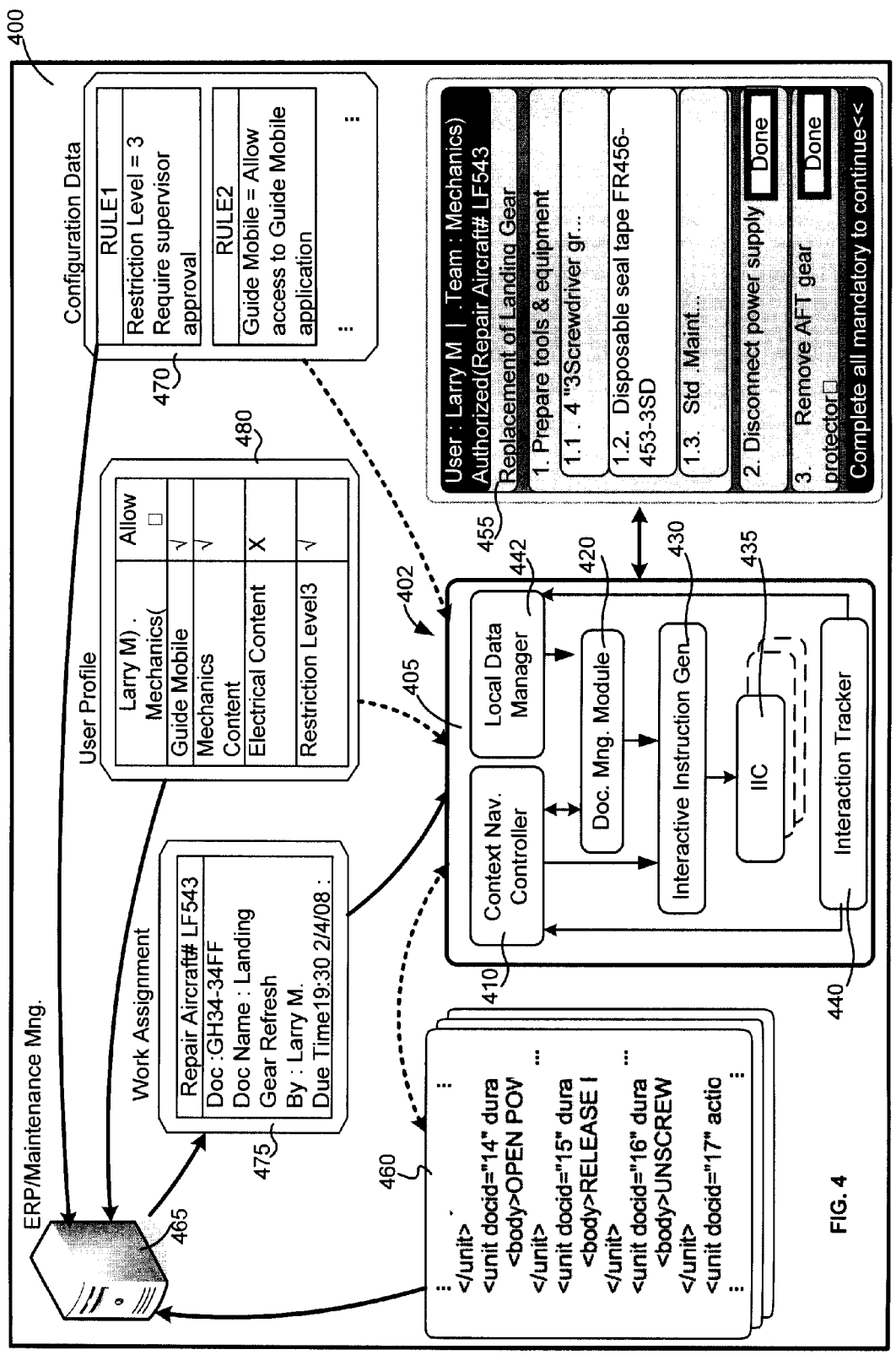
FIG. 4 is a graphical illustration of the interaction between the apparatus for providing assistance and control in respect of maintenance operations and the source of the electronic technical documentation and other sources of data which may be involved and influence the operation of the apparatus, as part of some embodiments of the invention.

Reference is now made to FIG. 4 which is a graphical illustration of the interaction between the apparatus and the source of the electronic technical documentation and other sources of data which may be involved and influence the operation of the apparatus, as part of some embodiments of the invention. According to some embodiments, the apparatus 405 may be part of a larger maintenance system 400 in an organization performing varied maintenance activities. In one embodiment, the maintenance system 400 may include a plurality of portable and stationary devices 402 (only one is shown in FIG. 4 for simplicity) which are utilized by maintenance personnel for assistance and control of maintenance operations. An apparatus 405 for providing assistance and control with respect to maintenance instructions, such as the one described herein with reference to FIG. 1, may be implemented on any such portable and stationary devices 402 and may facilitate assistance and control of maintenance operations through the device 402 on which it is implemented.

As part of some embodiments, the maintenance system 400 may include an electronic technical documentation repository 460. As was mentioned above, the electronic technical documentation repository 460 may be used to store the electronic technical documentation including the full set of EMIs including their metadata, relations, order and other items, such as book and chapter descriptors, or at least some relevant portion of the EMIs and other items. For illustration purposes, a snippet of a pseudo XML file is illustrated within the box representing the electronic technical documentation repository 460.

In further embodiments, the maintenance system 400 may further include a user profile repository 480. The user profile repository 480 may be used to store an electronic set of user related attributes of each one of a plurality of users including the user's credentials, personal and professional data related to the user and possibly other additional properties which apply to certain users. In FIG. 4 a graphical illustration of a segment of a user's profile is shown within the box representing the user profile repository 480.

In still further embodiments, the maintenance system 400 may further include a centralized configuration repository 470 including a configuration access module that is adapted to store and provide configuration rules and properties to the apparatus 405. The centralized configuration repository 470 may be used to store maintenance configuration rules or parameters which may be used to adapt the presentation and interaction sensitivity of electronic technical documentation along with additional functionality modifications of the apparatus 405. According to one example, the configuration rules and properties may be set to enable implementation of an organization's internal maintenance policies and may enable addition, removal or modification of certain EMIs. For example various configuration rules may adapt the sensitivity and response of certain IICs (which correspond to certain EMIs) to user interaction. It would be appreciated that an organization may desire to add, remove, customize or modify certain EMIs and/or user interaction properties with certain respective IICs, and possibly do so only under certain conditions or circumstances. The configuration rules and properties provided by the configuration repository 470 may be set to enable such control.

In addition to the examples of configuration rules which were already provided above, there is now provided a non-limiting list of various types of configuration rules and properties which may be implemented (independently or in cooperation with other components of the system 400) by the configuration repository 470. One or more of the configuration rules and properties may be general and relate to all or to a non-specific group of EMIs, while other configuration rules and properties may relate to a specific EMI or to a specific group of EMIs, the group consisting of specific EMIs. One or more of the configuration rules may relate to any user within the organization, while other configuration rules may relate to a specific user or to a specific group of users, for example, some configuration rules may relate to certain user credentials or other characteristics of a user and may enable adaptation of (or removal or addition) certain EMIs and or user interaction properties with the respective IICs per a certain user according to the user's credentials. One or more of the configuration rules or properties may relate to a certain EMI(s) or their respective IICs according to certain content included therein. One or more of the configuration rules or properties may relate to a certain EMI(s) which include a certain metadata attribute or field. One or more of the configuration rules or properties may relate to a certain EMI(s) which have a certain value or parameter within the metadata or its content (and possibly in connection with a specific metadata attribute or field); and one or more of the configuration rules may relate to features of the device 402, additional devices connected to it, a specific device system state or to the type of device on which the apparatus 405 is implemented.

As part of some embodiments of the invention, there is now provided one possible operation scenario for the maintenance system 400. While the operation scenario described below provides important insights regarding the operation of the maintenance system 400, it would be appreciated that other operation scenarios may also be applicable and that many such operation scenarios are within the scope of those of ordinary skill in the art. According to one embodiment, a supervisor may use an enterprise resource planning ("ERP") system 465 or some other type of task management module to generate maintenance tasks for users or for groups of users. In addition, a dispatch relay module 475 may be used to collect, adapt and distribute the dispatched tasks to maintenance personnel using the apparatus 405. The dispatch relay 475 may contain a data repository for storage of tasks. As was mentioned above, the ERP system 465 may be manually operated or may generate the tasks automatically according to certain predefined logic and dynamically evolving information about the enterprises resources. The ERP system 465 may also receive information about the enterprise's relevant workforce, for example, from the user profiles repository 480, however the necessary information about the users may reside on the ERP system 465 and retrieval may not be required. As will be described in further detail below, the dispatch relay module 475, whether directly or through the ERP system 465, may also receive configuration rules from the configuration repository 470. The implementation of the configuration rules and their effect on the tasks assigned by the ERP 465 shall be described in greater detail below.

The task file (or the task data in any other suitable data structure) may include, but is not limited to, the following: logistic data attributes for the task, such as the relevant equipment identification, maintainer or user identification and references to one or more items of the electronic technical documentation to be used as instructions for the maintainer while performing his task. The dispatch relay module 475 may implement the configuration rules provided by the configuration repository 470 to adapt the electronic technical documentation from the technical documentation repository 460 according to the organization's rules and policies and/or to customize the electronic technical documentation according to the specific maintainer or according to various parameters or conditions related to the maintenance task that is being processed. The dispatch relay module 475 may then submit the new task to the designated maintainer or assign a new/additional one based on the configuration rules.

After a task has been deployed by the dispatch relay module 475, a maintainer may log-in to the apparatus 405 using the maintainer's credentials. As was mentioned above, in some embodiments, the maintainer may log-in to the maintenance system 400 using any mobile or fixed device 402 implementing the apparatus 405 thereon. When a certain user/maintainer logs in to the device 405 acting as the apparatus 402, possibly passing communications through a gateway server (not shown), the apparatus 402 may connect to the dispatch relay module 475 to try and obtain a list of one or more tasks assigned to that user. As an alternative, and provided that adequate permissions have been put in place, a team-leader may obtain a list of tasks pending for the team-leader's subordinate maintenance team, According to the dispatch relay module 475, tasks for a certain user may be determined in advance; or the tasks may be generated on-demand, when the user logs on. In any case, when the user/maintainer logs-on via the apparatus 405, the dispatch relay module 475 determines which task is assigned to the respective user. As mentioned above, the task information received from the ERP 465 may include one or more context pointers which reference a certain subset of EMIs from the set of EMIs constituting the electronic technical documentation, or some portion thereof.

Additionally, the dispatch relay module 475 may also provide the user's device 405 with configuration rules which are effective for adding, removing or adapting certain EMIs and their respective IICs according to various characteristics or parameters related to the EMIs or related to the user or according to globally applicable configuration instructions. The configuration rules may be user specific, may relate to a certain group or users or may relate to the entire organization. The source of the configuration rules may be the ERP 465 or a dedicated configuration repository 470. For example, the configuration rules may be effective for eliminating EMIs that are below a certain level in the hierarchical scheme. In another example, the configuration rules may add a certain access control feature that is not specified by the metadata of certain EMIs. In yet another example, the configuration rules may adapt the font size for a certain user that is suffering from degraded eye-sight. Those with ordinary skill in the art may readily devise numerous other configuration instructions.

In some embodiments, following receipt of the dispatched task, the apparatus 405 may process the task information and may generate an indication related to the task assigned to the user. The apparatus 405 may cause a display unit 455 with which it is associated to display the list of one or more tasks currently assigned for the respective user, allowing the user to select a task and begin its execution. It should be noted that the initial task display is not shown in FIG. 4, rather what is shown is the rendering to screen of certain EMIs and a current active IIC 435. It would be appreciated however, that in other embodiments, user's approval of a certain task prior to invocation of the task by the apparatus 405 is not required and possibly also not implemented. Further details related to the generation of the presentation specification shall be described below.

According to some embodiments, following approval of the task by the user, the apparatus 405 may load the task logistic data attributes and present them to the maintainer. The presentation specification is discussed below. After review, the maintainer may choose to accept the task and start performing the task. Upon invoking a certain task, the apparatus 405 may attempt to load the referenced electronic technical documentation items from a local data repository, file or remote location (such as the electronic technical documentation repository 460). The apparatus 405 may use a technical documentation reference or pointer included with the task's logistic data attributes, for example, a context pointer, in order to specify a certain portion or segment of the electronic technical documentation which is relevant for the current task. In some embodiments, if the requested segment of the electronic technical documentation is not available for some reason, the apparatus 405 may load a predefined default time measurement and work reporting screen. When the referenced segment of the electronic technical documentation is available, the apparatus 405 may retrieve it and load the segment of the electronic technical documentation or some portion thereof. The apparatus 405 may generate a presentation specification for the loaded EMIs and other items of the electronic technical documentation to enable display thereof on a screen 455. The presentation specification may be based on a predefined layout style and may include a representation of one or more EMIs and a single current active IIC 435. For example, the presentation specification may include a specification for a respective IIC per each EMI within the subset or group of EMIs described above, or within a collection that is part of the subset or group of EMIs. In respect of one of the EMIs, the presentation specification may include a specification for an active IIC. For all the other EMIs in the subset/group/collection the presentation specification may include a specification for an IIC in a standby state. The presentation specification may include other information, such as personal and professional information of the user, a descriptor of the task system alerts and messages, a timer (not shown), etc.

According to some embodiments, once presented with the (graphical representation of the) list of IICs and the current active IIC active 435, the maintainer may start to perform the instruction of the current active IIC 435. Upon completion, the maintainer may click a completion acknowledgement button which is a part of the current IIC active 435 user interface or a predefined hardware button. An example of the graphical illustration of IICs in the complete state are provided in FIG. 4 by the IICs which include a presentation of a 'done' icon. In some embodiments, the maintainer may be allowed to browse the segment of the technical documentation currently loaded on the apparatus 405 using navigation buttons such as Next and Back, possibly before a certain IIC is completed (switching an active IIC to an 'idle' state for example). Selecting another IIC, for example, by clicking the Next button may generate a certain event and may cause the apparatus 405 to recalculate the next active instruction pointer and to refresh the display according to an updated list of IICs and an updated current active IIC. This process is described in further detail below. Within the present context it should be appreciated, that updating the browsing scenario described above may not cause the previous active IIC 435 to change its state to complete, allowing or possibly requiring the maintainer to go back to this IIC later and complete the instruction associated with it. The Apparatus 405 may then process the next active instruction pointer and refresh its screen to display an updated list of IICs and a new current active IIC.

As is shown by way of example in FIG. 4, since the current maintainer is inexperienced, the maintainer is required to acknowledge completion of lower level EMIs which constitutes a more detailed explanation of work instructions. As is also shown by way of example in FIG. 4, since the maintainer has no qualifications in electrical engineering operations, the maintainer will not be allowed to view or perform instructions that are marked as related to that field. Further details of the apparatuses' 405 operation during execution of a task shall be discussed below.

According to some embodiments, the apparatus 405, and in particular the interaction tracker 440 may be configured to track and record various user interaction(s), system state(s) and system or event(s) occurring within the context of an IIC activated on the apparatus 405. The interaction tracker 440 may also be configured to track and record information at the session and task levels, as well as information at a context level and possibly at other levels of the electronic technical documentation. The term "session" is used herein to describe a sequence of user interactions, system responses, system states and data inputs across the time period from the acceptance of a task and until the completion thereof. According to some embodiments, the interaction tracker 440 may be configured to generate a maintenance log in which various events and information relating to a certain maintenance session and/or to a certain maintenance task may be recorded. In addition or as an alternative, in accordance with some embodiments, the interaction tracker 440 may be configured to generate for one or more IICs activated on the apparatus 405 a respective IIC record. The IIC records may be part of a maintenance log or may be a separate data segment. In still further embodiments, the interaction tracker is configured to generate only IIC records.

An IIC record may contain various data related to the respective IIC, including an identifier of the IIC and data with respect one or more user interaction(s), system state(s) and system or event(s) occurring within the context of the IIC. The IIC records may comprise further information related to the IIC. The operation of the interaction tracker 440 and the types of data tracked and recorded by the interaction tracker 440 may be determined based on configuration rules provided by the configuration repository 470. One or more of the IIC records may be submitted to a remote server from time to time, where they may be archived or where further processing may take place, as will also be described in further detail below.

In some embodiments, the dispatch relay module 475 may receive from the apparatus 405 updates related to the progress of a certain maintainer's work, possibly including progress and other information at the discrete EMI level. The analysis of progress is done using the maintenance performance data collected on the server. The dispatch relay module 475 may be adapted to take into account the information regarding the process of one or more maintainers when processing current or subsequent task allocation scenarios. The analysis of IIC records shall be described in further detail below.

In the preceding discussion, the maintenance session was initiated by a dispatch relay module 475. It should be appreciated however that in further embodiments of the invention, the maintainer, through an apparatus 405 such as the one shown in FIG. 4 (or the one shown in FIG. 1), may be capable of initiating a similar maintenance process through the apparatus without reliance on an external ERP 475 or similar system. Furthermore, the use of a dispatch relay module 475 to generate tasks and accumulate configuration rules and possibly also user profiles is one possible implementation of the maintenance control and assistance system according to present invention. It would be appreciated that the system 400 may be otherwise implemented, including for example, through direct connection and interaction between the user through the device 402 on which the apparatus 405 is implemented and each of the relevant data sources, including for example, one or more of the electronic technical documentation repository 460, the ERP system 465, the user profiles repository 480 and the configuration repository 470.

For example, in one embodiment, the apparatus 405 may be capable of operating in a stand-alone mode, in which all required information is stored in a local data repository or file. The information may be brought from external sources including the electronic technical documentation repository 460, the user profile repository 480 and the configuration repository 470. The maintainer may use a table of contents selection menu to navigate his way throughout the hierarchy of electronic technical documentation (TOC entries may be associated with references or pointers to the relevant items), ultimately selecting one or more (e.g. a set) EMIs to work with. According to some embodiments, the table of context on the user's apparatus 405 may be generated in accordance with the user's credentials, personal and professional data related to the user and in accordance with some maintenance configuration rules or parameters, both were discussed above in detail. The apparatus 405 may collect work performance data (IIC records and/or task logs) and may store it locally until a connection to a server becomes available.

In yet a further embodiment of the invention, some of the data from the electronic technical documentation repository 460, the user profile repository 480 and/or the configuration repository 470 may be stored locally within the apparatus 405. The apparatus 405 may include a local data manager 442 which may obtain or receive the data from each of the above external sources, and store the data locally on a local repository (not shown). The local data manager 442 may be used to store a portion of the data on the external resources that is relevant to the operation of the apparatus 405. However, depending on the storage capacity that is available to the local data manager 442 and on the footprint of the data in terms of storage resources, the local data manager 442 may hold more data than is immediately necessary for the operation of the apparatus and any of its components. For example, the local data manager 442 may hold a complete copy of a certain electronic technical documentation rather than just some portion thereof that is required for the tasks at hand. The data on the local data manager 442 may be updated from time to time, either in response to a manual request from a user, or in accordance with some predefined routine or through updates initiated by the external sources. It would be appreciated that having all or some of the necessary data stored locally on the apparatus 405 may enable continued support and control of maintenance operations while the apparatus 405 is offline or when connectivity is not reliable or constant.

Having described embodiments of the invention related to the interaction between the apparatus 405 and external data resources (or with a local data manager 442), there is now provided a description of embodiments of the invention which are related to generation of IICs, and to the manner by which different data items influence the generation thereof.

Further with reference to FIG. 4, according to some embodiments, the apparatus 405, for example, via the instruction controller generator 430, may be adapted to provide a presentation specification for enabling rendering of a user-interface using a display such as the display unit 455. The display unit 455 may generate the graphical user-interface component based on the presentation specification of IICs, including an active IIC. The instruction controller generator 430 may be adapted to generate the presentation-specification based on the current context pointer or the current group of context pointers, the current active instruction pointer, and the predefined order and hierarchy according to which the set of maintenance instructions are connected to one another. According to further embodiments, in addition or as an alternative to the current context pointer, the instruction controller generator 430 may be adapted to generate the presentation-specification based on the pointer or pointers referencing the EMIs in the group of permitted EMIs. According to still further embodiments, in addition or as an alternative to the predefined order and hierarchy according to which the set of maintenance instructions are connected to one another, the instruction controller generator 430 may be adapted to generate the presentation-specification based on a certain sequence of EMIs determined by the documentation structure in cases of XML, SGML; or in another example, based on ascending or descending numeric value such as that which is commonly used for sorting entries in database tables and in other forms of structured data storage.

According to some embodiments, the instruction controller generator 430 is adapted to include within the presentation-specification data representative of the active IIC 435 generated for the maintenance instruction referenced by the active instruction pointer. The instruction controller generator 430 may include within the presentation specification, in connection with the active IIC 435, information related to (one or more) software component(s) of the active IIC 435 that is (are) sensitive to a predefined user-interaction and/or to a predefined system state or event. In some embodiments, the active IIC 435 may include a specification for generating or implementing a user interface or a system interface for enabling detection or recordation of the predefined user-interaction and/or the predefined system state or event which the active IIC 435 is sensitive to. For example, the presentation-specification associated with a certain active IIC 435 may include a specification of a touch-screen button which the user may click to indicate completion of the maintenance instruction associated with the active IIC 435. The touch-screen button specification may be associated with a respective software component of the active IIC 435 which may be sensitive to the user clicking the specific area of the touch-screen button for switching the state of the active IIC 435, for example to a complete state.

In case the active IIC 435 includes a plurality (two or more) of event sensitive software components, an event being each one of a predefined user-interaction and/or a predefined system state or event, the presentation-specification associated with the IIC active 435 may include per each of the plurality of event sensitive software components a specification of a user interface or a system interface for enabling detection or recordation of a predefined user-interaction and/or a predefined system state or event which the respective event sensitive software component is sensitive to. According to further embodiments, the instruction controller generator 430 may be adapted to include within the presentation specification, in association with or as part of the data corresponding to an active IIC 435, data with respect to one or more possible states of the active IIC 435. In association with each one of the one or more possible states, the instruction controller generator 430 may be adapted to specify a user interface or a system interface and a certain input that may be detected through the user interface or through the system interface, and that when detected is configured to trigger the respective state.

Examples of user interfaces or system interfaces which may be generated for enabling detection or recordation of a predefined user-interaction and/or a predefined system state or event which the active IIC 435 is sensitive to may include a user control containing at least a touch sensitive area such as a button or a link. The user control may further contain a text display area in which the content of the respective of EMI may be displayed as text. The active IIC 435 may be adapted to be sensitive to a mouse click or a screen touch within the defined area of the button or link and may be responsive for triggering a user interaction event as a result.

According to some embodiments, the instruction controller generator 430 may be adapted to include within the presentation specification, in association with or as part of the data corresponding to the active IIC 435, data representative of a content of the EMI referenced by the active instruction pointer with which the active IIC 435 is associated.

According to further embodiments, in addition to the content of the active ITC 435 and the specification for generating a user interface or system interface mentioned above, the instruction controller generator 430 is further adapted to include in the presentation specification related to the active IIC 435 a specification for an input field. The input field specification may be based on the metadata contained within (or otherwise corresponding with) the EMI referenced by the active instruction pointer associated with the active IIC 435; or in further embodiments, in addition or an alternative to the metadata, the input field may be generated according to a predefined policy implemented by the apparatus 405, for example, according to a policy obtained from the configuration repository 480.

The input field specification may be associated with the software component of the active IIC 435 that is that is sensitive to a predefined user-interaction and/or to a predefined system state or event, for example, the input field may be intended to enable the user to interact in the prescribed manner for indication completion of the respective maintenance instruction. As an alternative, or in addition, the input field specification may associate a certain input received through the input field with one of the states of the active IIC 435. For example, a certain input that is received through the input field may trigger a respective change in the state of the active IIC 435. According to further embodiments of the invention, the presentation specification may include a specification for an input field that is unrelated to any event sensitive component of the active IIC 435 and may enable entering of a certain input without triggering the event sensitive software components or the altering of the state of the active IIC 435.

Examples of input fields which may be generated based on an input field specification that is part of the presentation specification for a certain active IIC 435 may include for example the following types of input fields: a text input field, a drop-down list selection field, a radio-buttons selection field, a text box field, a file attachment field, a voice-recording input field, an image capture and recording field, a barcode input field, a global positioning system ("GPS") coordinates input field, and a wireless reception parameter input field. According to some embodiments, the input field specification may indicate one or more possible sources of the input that may be attached to the input field, including, for example, but not limited to the following sources: a GPS device, a wireless communications link, a Camera or an Imager, a RFID device, a IR link, a Data Cable link, an on-screen touch operated manual input and a hardware button manual input.

According to some embodiments, the instruction controller generator 430 is adapted to include within the presentation specification, in association with or as part of the data corresponding to the active IIC 435 and with respect to one or more possible states of the IIC, a subsequent active instruction pointer that is associated with the respective state or a subsequent context pointer or a subsequent group of context pointers that are associated with the respective state. The subsequent active instruction or context pointer for each IIC and for each state of each IIC may be predefined and may be provided to the instruction controller generator 430 by the navigation controller 410, for example; or in further embodiments a subsequent active instruction or context pointer may be determined on-the-fly, for example, upon the processing of the current context within the electronic technical documentation, at the beginning of a user's session, or following the altering of a state of each IIC (including, but not limited to, following completion of the IIC). Resolving a subsequent active instruction or context pointer and/or controlling the invocation of other items of the electronic technical documentation and external resources may be carried out by the navigation controller 410. In further embodiments the instruction controller generator 430 may also be involved in the process of resolving a subsequent active instruction and/or in the process of invoking other items of the electronic technical documentation and external resources.

The instruction controller generator 430, based on data received from the navigation controller 410, is adapted to include within the presentation specification data representative of one or more IICs in a standby state in addition to the data with respect to the active IIC 435. For example, in some embodiments, the instruction controller generator 430 is adapted to include within the presentation specification data representative of one or more IICs which are associated with respective EMIs which surround (or exceeding or preceding) the EMI referenced by the active instruction pointer. The EMIs which surround the EMI referenced by the active instruction pointer may be determined according to the predefined order and hierarchy by which the EMIs in the electronic technical documentation are connected to one another. In further embodiments, the instruction controller generator 430 is adapted to include within the presentation specification an indication regarding a predefined sequence which determines the order by which the IICs referenced by the presentation specification are connected to one another. In still further embodiments the instruction controller generator 430 is adapted to include within the presentation specification a sequencing rule or function for enabling to determine the order by which the IICs referenced by the presentation specification are connected to one another. The predefined order or the sequence of IICs may be provided within the presentation specification via inclusion of a subsequent active instruction pointer(s) or a subsequent context pointer(s) in the presentation specification of each IIC.

According to some embodiments, the instruction controller generator 430 is adapted to implement a distinguishing representation feature with respect the active IIC, to thereby enable distinctive representation of the active IIC 435 on a user-interface, compared to the other IICs in respect of which data is provided by the presentation specification and which are optionally in a standby state. For example, the instruction controller generator 430 may implement a distinctive display feature distinguishing the appearance of the currently active IIC 435 compared to other IICs displayed on the display unit 455. Further by way of example, according to one distinguishing representation feature, at least a portion of the data representative of the content of each one of the IICs in the standby state may be disabled or removed from the presentation specification. It would be appreciated that in further embodiments, the scope of the presentation specification may extend beyond a certain group of permitted EMIs; or beyond a certain set of EMIs which constitute a current context within the electronic technical documentation; or the scope of the presentation specification may correspond to some portion of a certain group of permitted EMIs; the scope of the presentation specification may be limited to some portion of a current context within the electronic technical documentation.

Figure 5A:
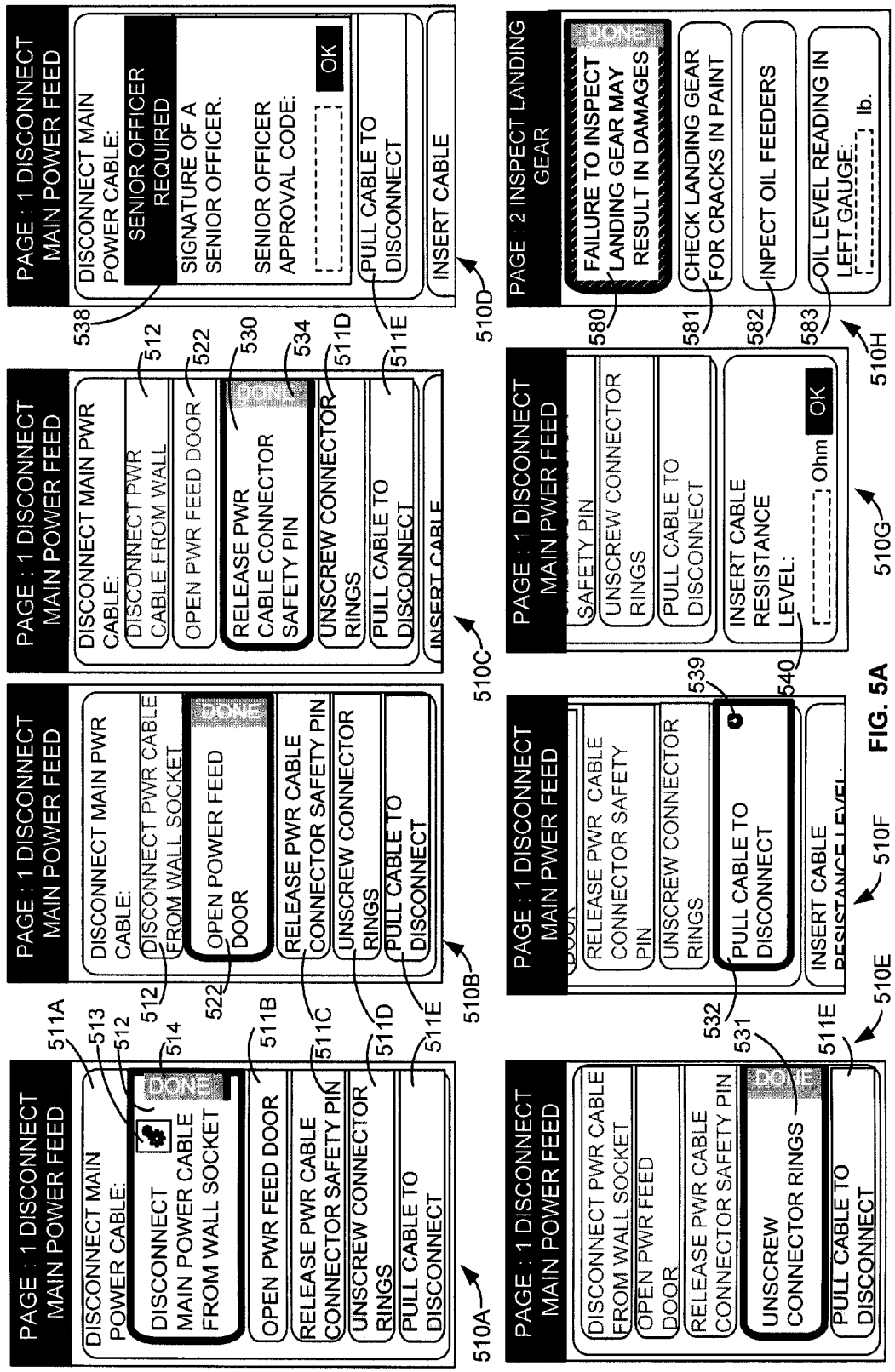
FIG. 5A provides a graphical illustration of a rendering of a presentation specification provided by the apparatus for providing assistance and control in respect of maintenance operations on a GUI display for a junior maintenance engineer, as part of some embodiments of the present invention.
Figure 5B:
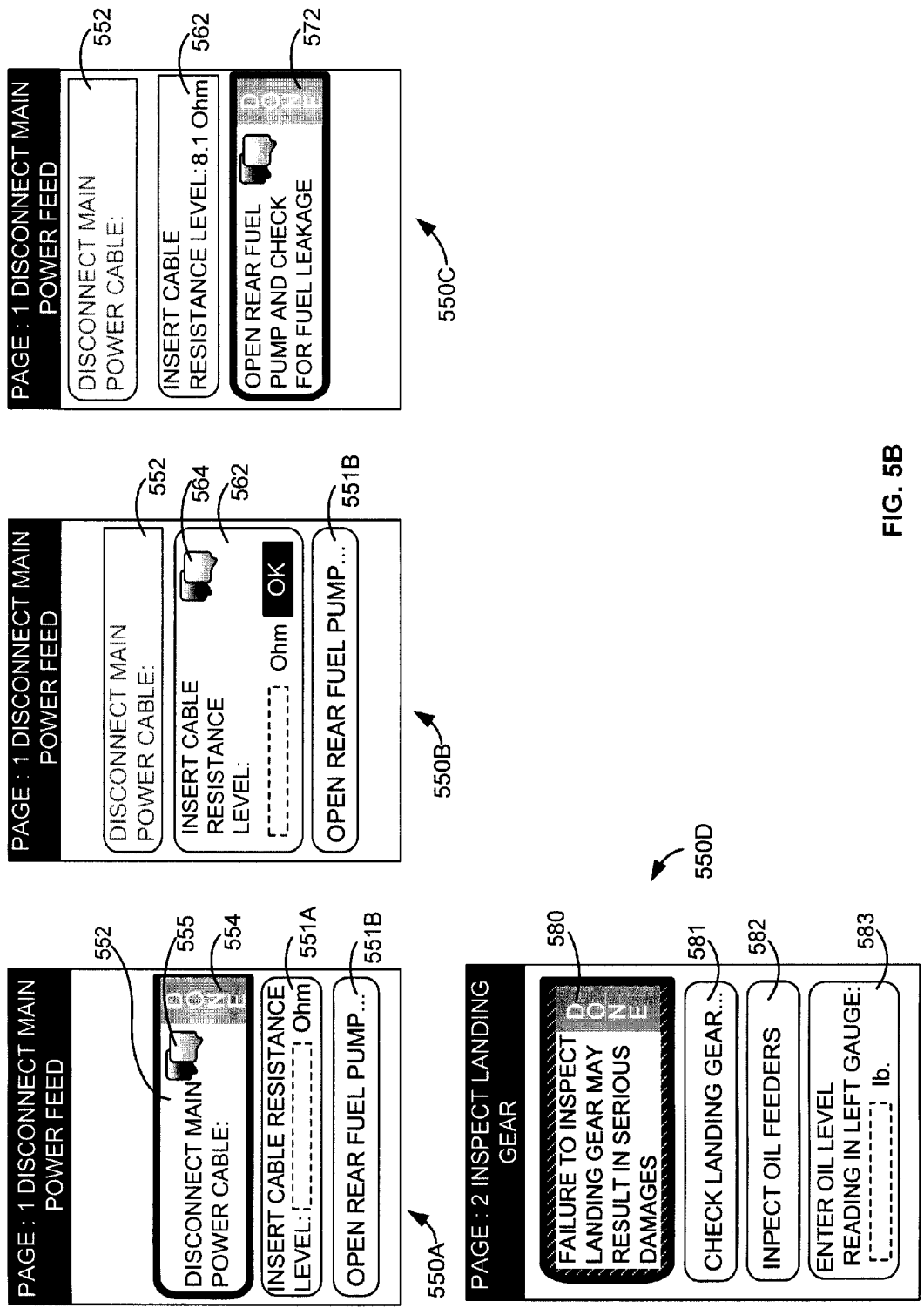
FIG. 5B provides a graphical illustration of a rendering of a presentation specification provided by the apparatus for providing assistance and control in respect of maintenance operations on a GUI display for a senior maintenance engineer, as part of some embodiments of the present invention.

Having described various embodiments of the invention which are associated with the presentation specification and the control thereof reference is now made to FIGS. 5A and 5B which provide a graphical illustration of a rendering of a presentation specification provided by the apparatus on a GUI display, as part of some embodiments of the invention. In FIG. 5A there is shown a rendering on a GUI display of a presentation specification provided by the apparatus for a junior maintenance engineer, as part of some embodiments; and in FIG. 5B there is shown a rendering on a GUI display of a presentation specification provided by the apparatus for a senior maintenance engineer.

As can be seen in FIGS. 5A and 5B, the initial GUI display 510A and 550A for both the junior and the senior maintenance engineers includes data representative of a current IIC 512 and 552, respectively. The current active IICs 512 and 552 generated for both the junior and the senior maintenance engineers include the content of the EMI referenced by the active instruction pointer with which the active IICs 512 and 552 are associated. The presentation of the active IICs 512 and 552 also includes a touch-screen button 514 and 554 generated according to a respective touch-screen button specification. The touch-screen button specification may be generated in accordance with one or more of: the configuration rules, the user profile and/or the respective EMI or a specification provided by some other item of the electronic technical documentation. The touch-screen button 514 and 554 of the junior and the senior maintenance engineers may be associated with a software component of the respective active IIC 512 and 552. The software component is sensitive to the user clicking the specific area of the touch-screen button 514 and 554 for switching the state of the respective active IIC 512 and 552, for example to a 'complete' state.

In addition to the current active IICs 512 and 552, the initial GUI display 510A and 550A for both the junior and the senior maintenance engineers includes a graphical representation of additional 'non-active' (e.g., in a standby state) IICs 511A-511E and 551A-551B surrounding the current active IICs 512 and 552. The additional 'non-active' IICs 511A-511E and 551A-551B displayed correspond to the permitted EMIs within the current context that are not associated with the current active instruction pointer, or some portion of the group of permitted EMIs. In FIGS. 5A and 5B, the initial GUI display 510A and 550A for both the junior and the senior maintenance engineers includes a graphical representation of the EMIs which succeed the EMI that is referenced by the current active instruction pointer. As can be seen, the current active IICs 512 and 552 are distinguished (in a visual manner in this case) from the 'non-active' IICs 511A-511E and 551A-551B surrounding them. In the embodiments shown in FIGS. 5A and 5B, the display of each of the 'non-active' IICs 511A-511E and 551A-551B surrounding the current active IICs 512 and 552 includes only a portion of the content of each one of the respective EMIs. Another distinguishing feature may be the coloring of the area of the screen associated with the 'non-active' IICs 511A-511E and 551A-551B which may be dimmed compared to the area of the display showing the active IICs 512 and 552.

As can also be seen in FIGS. 5A and 5B, the GUI display for the junior and the senior maintenance engineers 510A and 550A is not identical. Specifically, the junior and the senior maintenance engineers are each presented with a different list of IICs. The GUI display 550A of the senior maintenance engineer includes a graphical representation of IICs which correspond to only high level EMIs 551A-551B, whereas the GUI display 510A of the junior maintenance engineer includes a graphical representation of IICs which correspond to the high level EMI 511A but also a to lower level EMIs 511B and 511E. Furthermore, the senior maintenance engineer's GUI display 550A of the current active IIC 552 includes a specification for a comments input field, which is represented here by a clickable link/icon 555 responsive for invoking a comments field input. The comments input field may enable the senior engineer to enter some input that will be stored with reference to the EMI associated with active IIC 552 for feedback and possible future modifications. The handling of the data inputs and possible uses of the inputs shall be discussed below.

In response to the current active IICs 512 and 552 being switched to a completed state, a subsequent active instruction pointer may be invoked, and as was discussed in detail above, the invocation of the subsequent active instruction pointers may cause new IICs 522 and 562 to be activated and the GUI display for the junior and the senior maintenance engineers to be updated 510B and 550B. According to some embodiments, the display of the now previous active IICs 512 and 552 may be updated. The updated display may include an indication that the EMI associated with the previous active IICs 512 and 552 is complete. According to further embodiments, a portion of the content of the EMI associated with each of the previous active IICs 512 and 552, and possibly some other features and controls, possibly such that are associated with certain metadata of each of the previous active IICs 512 and 552 may be removed from the display of the EMIs associated with the previous active IICs 512 and 552.

As is shown in FIGS. 5A and 5B and according to some embodiments, the new active IIC 522 for the junior maintenance engineer is one of five IICs which corresponds to respective lower level EMIs which collectively provide a more elaborate maintenance plan of a single, higher level, EMI, which is associated with the IIC denoted by 511A for the junior maintenance engineer. The new active IIC 562 for the senior maintenance engineer corresponds to the higher level EMI only, and thus the senior maintenance engineer is not required to go through the five lower level EMIs in order to complete the higher level instruction.

Figure 5C:
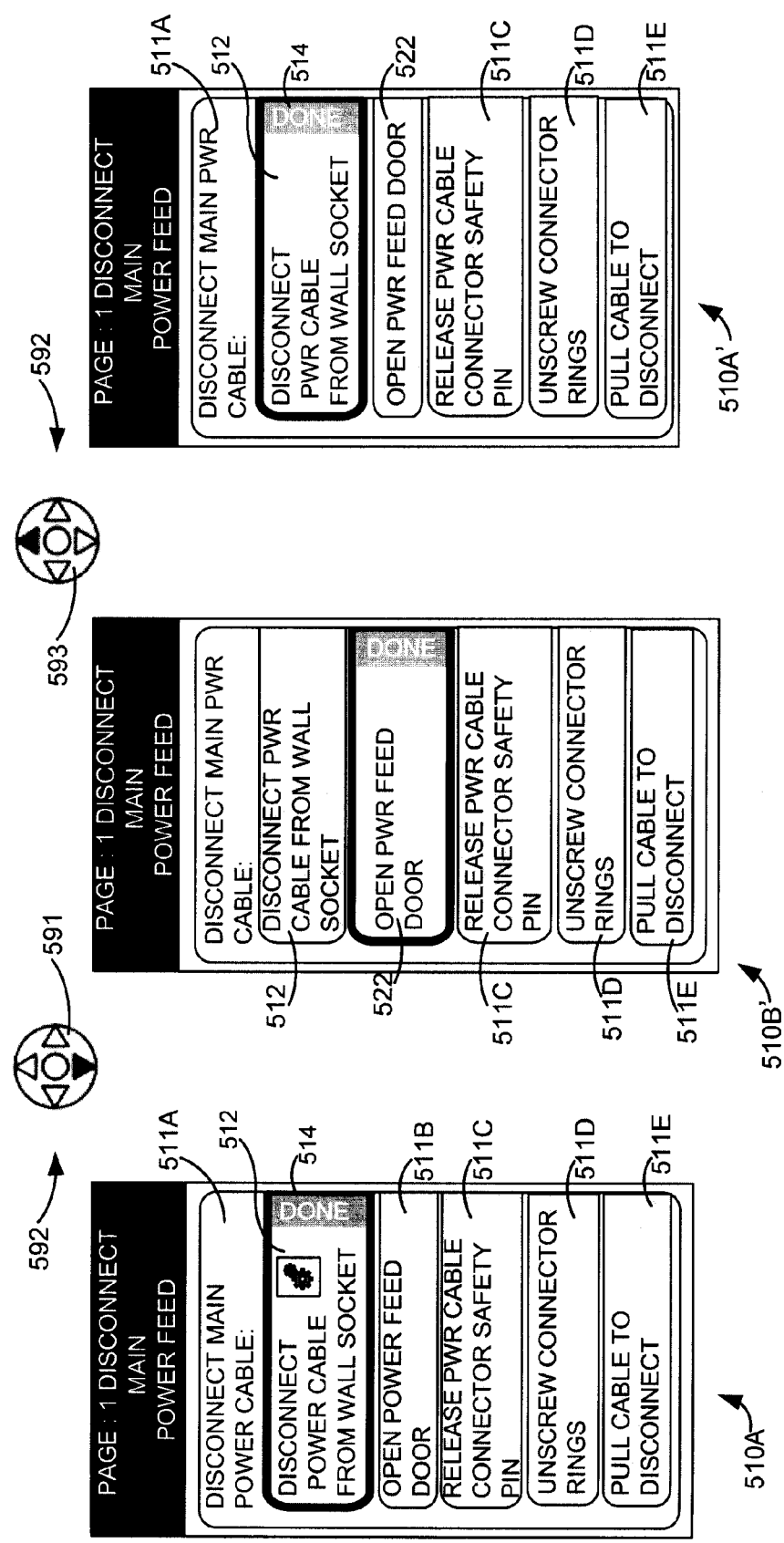
FIG. 5C is a graphical illustration of a rendering on a GUI display of an alternative interaction sequence by a junior maintenance engineer involving a dedicated navigation button, as part of some embodiments of the invention.

Continuing with the illustration of the rendering on a GUI display of the presentation specification provided by the apparatus according to some embodiments of the invention, reference is now made to FIG. 5C, which is a graphical illustration of a rendering on a GUI display of an alternative interaction sequence by a junior maintenance engineer involving a dedicated navigation button, as part of some embodiments of the invention. In the alternative interaction sequence shown in FIG. 5C, the initial while the GUI display is the same as in FIG. 5A. However, in the embodiment shown in FIG. 5C while active IIC 512 is in the active state (to which the IIC is initialized), the user may press a dedicated hardware navigation button 592 or any other navigation event generator (such as a certain area of the touch-screen display) without completing the active IIC 512, for example, without clicking the 'done' touch-screen button.

As was mentioned above the active IIC 512 may be sensitive to a plurality of user interactions and/or system states or system events (one or more of each), and the active IIC 512 may include a distinct event handler and/or a distinct subroutine that is sensitive to a respective one of the predefined user-interactions, system states or events corresponding with the active IIC 512. Thus, in addition to the 'done' touch-screen button, the active IIC 512 may include an event handler that is sensitive to the user pressing a dedicated hardware navigation button 592 or activating any other navigation event generator. According to some embodiments, and as is illustrated in FIG. 5C, the navigation event may trigger the respective event handler of the active IIC 512 (or a respective subroutine within an event handler that is sensitive to a plurality of events for triggering a plurality of respective states), and the event handler may cause the state of the currently active IIC 512 to switch to an 'idle' state. Idle state is used herein as one example of a state of an IIC which may be triggered in addition to an 'active' and a 'complete' state. The event handler may also be configured to cause certain parameters related to the active IIC 512 to be cached or otherwise stored on a storage medium or within a memory module (not shown in FIG. 5C). The parameters related to the IIC 512 may be retrieved from the cache, for example, when the state of the IIC 512 is switched back to 'active', as will be described below.

In addition, the event handler triggered by the navigation event may invoke a subsequent active instruction pointer. The active instruction pointer invoked by the event handler may be determined according to the state of the IIC 512 that was triggered by the navigation event. The active instruction pointer invoked by the event handler may also be determined according to the navigation event or according to the state of the IIC 512 that was triggered by the navigation event. For example, in case the event handler is invoked in response to the user clicking a certain area of the touch-screen display, the IIC that is associated with that area may be determined and that IIC may be switched to the active state, thereby constituting the subsequent active IIC. In another example, in case the event handler is invoked in response to the user clicking a certain area of a dedicated navigation module 592, such as an downwards pointing arrow button 591, the IIC that is associated with that area may be determined and the and that IIC may be switched to the active state. In FIG. 5C pressing the downwards button invokes an active instruction pointer associated with the IIC denoted by 511B, which is immediately subsequent (according to the predefined order and hierarchy scheme) to the current active IIC 512.

According to some embodiments, as a result of the IIC 512 switching to the idle state, the display of the previously active IIC 512 IIC may be updated. In FIG. 5A the updated display is denoted by 510B'. In one example, the display of the previously active IIC 512 in an idle state may be similar to display of an IIC in a completed state. One possible difference is that instead of an indication that the IIC is complete, there may be an indication that the IIC 512 is idle in one embodiment, or an indication that the IIC is active in another embodiment. Other differences may also apply. In FIG. 5C however, and according to further embodiments, the IIC 512 in the idle state is similar to the display of the inactive IICs 511C-511E. In addition the display may be updated with a new current active IIC 522 which is generated based on the active instruction pointer invoked as a result and based on the navigation event.

In one embodiment, and as is shown in FIG. 5C by way of example, the user may be allowed to continue browsing freely across the electronic maintenance documentation or some portion thereof, e.g., within the IICs corresponding to the group of EMIs constituting the permitted EMIs within the current context. The user may continue navigating using, for example, the dedicated navigation button 592. In FIG. 5C the user selects the upward navigation button 593 before completing the currently active IIC 522 and as a result, a new display is rendered 510A', which is in this case substantially identical to the initial display 510A. In the display denoted 510A', as a result of the user's selection, IIC 512 is switched back to the active state and the previously active IIC 522 is switched to the idle state. As is shown in FIG. 5C the active IIC 512 is distinctively displayed whereas the display of the idle IIC 522 is similar to the other non-active EMIs 511A and 51C-511E.

However, in a further embodiment, following the switching of an IIC 512 to an 'idle' state, the active new IIC 522 may include a reference to the EMI that is associated with the previous active IIC 512 (now idle) or the previous active IIC 512 itself, thereby causing the previous IIC 512 to be invoked upon completion of the new active IIC 522. In further embodiments, the user may choose not to carry out the instruction associated with IIC 512, while that IIC 512 is active, and may continue to browse freely or in accordance with some predefined sequence through the IICs or through some portion of the IICs, e.g., through IICs which are related to EMIs within the current context; or through IICs which are related to the permitted EMIs within the current context. According to still further embodiments, the user's progress across the IICs may be restricted in various ways and by various means and the user may not be allowed to progress beyond a certain point unless all or some of the IICs are turned into the complete state. For example, the junior maintenance engineer may be prevented from progressing further through the list of IICs, in one example, or through to the next context, in another example, in case a certain amount of time has passed since the IIC 512 was put in an idle state, or beyond a certain IIC, e.g. beyond the subsequent IIC 522. In still further embodiments, the event handler(s) of the current active IIC 522 may all reference the previous active IIC 512 without the possibility of overwriting.

Figure 5D:
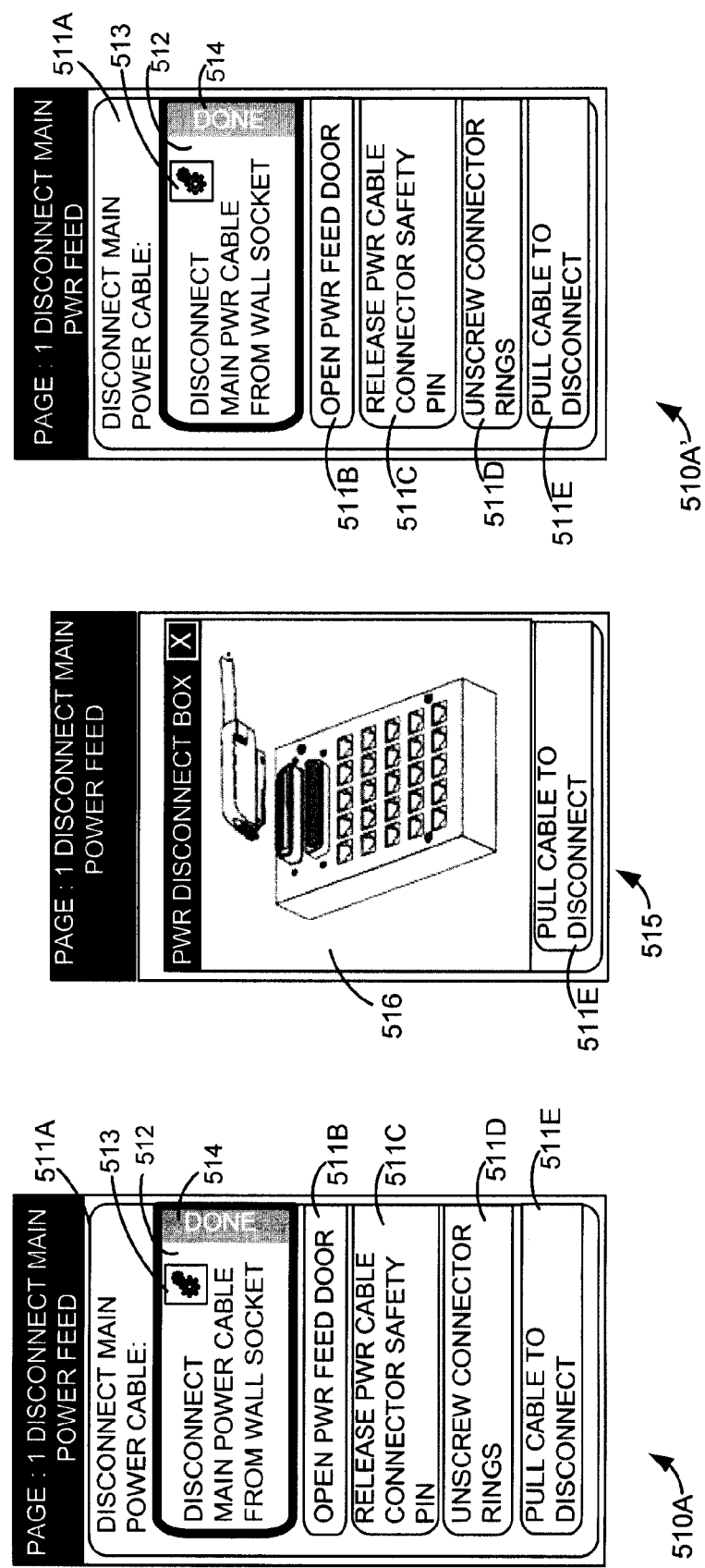
FIG. 5D is a graphical illustration of a rendering on a GUI display of an alternative interaction sequence by a junior maintenance engineer involving an invocation of a reference to a supplementary resource, as part of some embodiments of the invention.

Another type of reference which may be invoked from the context of a certain active IIC is illustrated in FIG. 5D, which is a graphical illustration of a rendering on a GUI display of an interaction sequence by the junior maintenance engineer involving an invocation of a reference to a supplementary resource, as part of some embodiments of the invention. According to some embodiments, a reference to a supplementary resource may be a reference to a certain resource of the electronic technical documentation or any to any other external resource. Some examples of supplementary resource references may include, but are not limited to the following: a technical drawing, a textual description, a web site, a database entry, an EMI that is part of the electronic technical documentation or some portion of an EMI or other item of the electronic technical documentation. It would be appreciated that invoking a reference to a supplementary resource, including a supplementary resource reference which points to another EMI (not the one with which the IIC is associated), may not be directly related to any state switch of the current active IIC, and invoking the supplementary resource reference may not require that the state of the current active IIC be modified, nor cause the state of the active IIC to change. Invoking the supplementary resource reference may also note that the state of the IIC be switched back to 'active' to resume interaction with the IIC.

Referring to FIG. 5D, according to some embodiments, the display presentation of the currently active IIC 512 may include a presentation of a reference to a supplementary resource 513, in this case, and as an example only, a technical drawing 516 that is available through the electronic technical documentation. The user may select to open the resource referenced by the supplementary resource reference 513. The drawing 516 may be invoked within the context of the IIC 512 that referenced it. The display may be updated as a result of the invocation of the reference to a supplementary resource, as is illustrated in FIG. 5D by the display illustration denoted by the numeral 515. Once opened, the user may interact with the drawing 516, for example, zooming in and out, and the user's interaction or various system states or events associated with the drawing 516 may be monitored and recorded within the context of the respective active IIC 512. When the user has completed using the drawing 516 or in response to some event (e.g., the user clicking on the close window button illustrated by a cross in FIG. 5D), the drawing 516 may be removed or disposed from the display and the display may return, in principle, to its previous content, although some features may be updated, such as a timer, for example. In FIG. 5D the display following the dismissal of the drawing 516 is denoted by the numeral 510A' and is essential identical to the initial display 510A. According to some embodiments, throughout the user's interaction (or review) with the technical drawing 516, the IIC 512 may remain in the active state in the background.

Continuing with the description of FIG. 5A, following completion of the IIC referenced by the numeral 522, the display is updated to indicate completion of the IIC 522 and progress to the subsequent EMI which is associated with the new currently active IIC 530. This display is referenced 510C in FIG. 5A. In FIG. 5A, and according to some embodiments, in order to complete the currently active IIC 530, the junior maintainer may be required to obtain, in addition to clicking the 'done' touch-screen button 534, a password input from a senior officer. As an example, in FIG. 5A, in response to the user clicking the 'done' button 534, the display may be updated and the screen referenced by the numeral 510D may be displayed, in which a pop-up window requesting a senior officer's signature 538 is overlaid on top of the list of EMIs. The senior officer's signature popup window 538 may include an input field into which a unique ID input which represents a password authentication by a senior officer (such as a senior maintenance engineer) must be provided in order to complete the respective IIC 530. The senior officer's signature popup window 538 with the password input field may originate from respective metadata of the EMI referenced by the active instruction pointer with which the IIC 530 is associated. In a further embodiment, the senior officer's signature popup window 538 may originate from a respective configuration rule. The configuration rules may be globally applicable or may be related to some content, metadata value or field of the EMI associated with the currently active IIC 530 and/or may be related to the user's credentials or to some personal or professional characteristic of the user or of a group which the user is part of, etc.

The invocation of the pop-up window 538 may be enabled by the event handler associated with the respective active IIC 530. For example the active IIC 530 may include an event handler which is responsive to the user clicking the 'done' button for switching the active IIC 530 to a 'pending authentication' state (the title is not necessarily significant) and in response to the switching of the IIC 530 to the 'pending authentication' state, the senior officer's signature 538 window may popup. In some embodiments, the user may be required to obtain the necessary authentication before being allowed to continue with the maintenance task; or in further embodiments, the user may be allowed to continue with the maintenance task and to proceed to the subsequent IIC, whichever it may be, before the senior officer's authentication with respect to IC 530 is obtained.

In some embodiments, Once the senior officer's password is obtained and authenticated, an event handler of the IIC 530 may be triggered and may cause the state of the IIC 530 to switch to the 'complete' state resulting in the invocation of a subsequent active instruction pointer and the generation of the respective subsequent active IIC 531. From there, the user may proceed to the display referenced by the numeral 510F by clicking the 'done' button associated with IIC 531. The clicking of the 'done' button associated with IIC 531 may invoke the activation of the subsequent IIC 532. As an example, the active IIC 532 may include an event handler that is responsive to a system state trigger, namely a system timer running down, as opposed to the user interaction trigger implemented in connection with the previous active IICs 512, 522 and 530-531. The timer controlled trigger is represented by the clock icon 539 displayed within the presentation of the active IIC 532. The timer controller trigger is described in the context of active IIC 532 for purposes of illustration only. Following the switching of the IIC 532 to the 'complete' state, the user effectively completes the EMI referenced by the numeral 511A which is a high level EMI consisting of five sub-level EMIs associated with IICs 512, 522 and 530-532. Referring back to FIG. 5B, in accordance with some embodiments, the senior maintenance engineer is presented and is required to interact only with a single IIC, namely IIC 552 which corresponds with the high level EMI referenced by the numeral 511A, and is not presented with five IICs which correspond to the five sub-level EMIs. In some embodiments, this aspect of the display specification may be associated with a configuration rule specifying that senior maintenance engineers are exempt from interacting or being presented with sub-level EMI.

The following screen 510G of the junior maintenance engineer, and the subsequent screen 550B of the senior maintenance engineer are similar, with both presenting an active IIC 540 and 562, respectively which is associated with a subsequent EMI, that in this case is a high-level EMI that does not include any sub-level EMIs, thus the similar display. One difference is the link (icon) 564 to a comment field window which appears on the senior's presentation of the active IIC 562. Both active IICs' presentation 540 and 562 include an input field into which the user or some interface utilized by the user is required to input relevant information. The input field may be generated based on metadata of the respective EMI or in accordance with a specification obtained from other sources, such as the maintenance configuration rules module for example. The input may be stored, for example, within an IIC record together with other information that is related to the respective IIC, in this case IICs 540 and 562. Further details regarding the IICs records shall be provided below.

Referring to FIG. 5B, the GUI display of the senior maintenance engineer may include a graphical representation of a certain IIC 551B which is designated for senior engineers only. The designation of the IIC 551B as "senior only" may be based on the metadata of the respective EMI or may be prescribed by a respective configuration rule. The EMI associated with the IIC 551B may be removed from the group of permitted EMIs of the junior maintenance engineer, and the graphical representation of the "senior only" IIC 551B is thus absent from the GUI display of the junior maintenance engineer. Following the completion of IIC 562, the display of the senior maintenance engineer may be updated and the screen referenced 550C may be displayed. On screen 550C, an active IIC 572 associated with the "senior only" EMI 551B may be presented.

Following completion of IIC 572 by the senior maintenance engineer and IIC 540 by the junior maintenance engineer, the maintenance task for both engineers may proceed to the next page as illustrated on screens 550D and 510H, respectively. A page in this case represents a context within the electronic technical documentation. Presentation of page 2 "INSPECT LANDING GEAR" may involve invocation of a subsequent context pointer. The invocation of a subsequent context pointer was described above. As is shown in FIGS. 5A and 5B, page 2 "INSPECT LANDING GEAR" begins with a warning 580 which the user is required to acknowledge before being allowed to proceed with the subsequent IIICs 581-583. The warning may be an IIC corresponding to an EMI prescribed in the electronic technical documentation or may correspond to some other item of the electronic technical documentation. In further embodiments, some warnings may be generated based on a configuration rule.

Reference is now made to FIG. 6, which is a graphical illustration of a task log which may be generated on an apparatus for providing assistance and control in respect of maintenance operations, according to some embodiments of the invention. The task log shown in FIG. 6 is based on the maintenance session of the junior maintenance engineer that was described above with reference to FIGS. 5A, 5C and 5D. In the description below reference is additionally made to components of the apparatus shown in FIG. 1. According to some embodiments, as was already mentioned above, the IIC records may be generated by the interaction tracker 40 and may be stored on a local storage 44 residing or within or managed by a local data manager 42. According to some embodiments, the interaction tracker 40 may be configured to track and record various user interaction(s), system state(s) and system or event(s) occurring within the context of an IIC activated on the apparatus 100. For example, while an IIC is in the active state, the interaction tracker 40 may be configured to listen to one or more user interaction(s), system state(s) and system or event(s) occurring within the context of the IIC and may record various data related to the events. In some embodiments, the interaction tracker 40 may record data related to the activation and the completion of a certain IIC. In further embodiments, the interaction tracker 40 may record additional events which occur within the context of a certain IIC, possibly including events which do not result in the state of the IIC being switched.

According to further embodiments, the interaction tracker 40 may also be configured to track and record information at the session and task levels, as well as information at a context level and possibly at other levels of the electronic technical documentation. For illustration purposes, the task log shown in FIG. 6 relates to the IICs 512, 522, 530-532 and 540 which correspond to the EMIs which constitute the junior maintenance engineer's group of permitted EMIs within the context of page 1 "DISCONNECT MAIN POWER FEED" and includes the respective events illustrated in FIGS. 5A, 5C and 5D. According to still further embodiments, the interaction tracker 40 may be configured to track and record various user interaction(s), system state(s) and system event(s) which trigger a state alteration of each relevant IIC, or which trigger a certain event handler that invoked the state change.

According to some embodiments, when a new session is initiated on the apparatus 100, the interaction tracker 40 may generate a maintenance session log in which various events and information relating to a certain maintenance session and/or to a certain maintenance task may be recorded. In addition or as an alternative, in accordance with some embodiments, the interaction tracker 40 may be configured to generate for one or more IICs activated on the apparatus 100 a respective IIC record. The IIC records may be part of a maintenance log or may be a separate data segment. In still further embodiments, the interaction tracker 40 is configured to generate only IIC records.

In some embodiments, an IIC record may contain various data related to the respective IIC, including an identifier of the IIC and data with respect to one or more user interaction(s), system state(s) or event(s) occurring within the context of the IIC, as is illustrated for example, by task log shown in FIG. 6. The IIC record may comprise further information related to the respective IIC. The operation of the interaction tracker 40 and the types of data tracked and recorded by the interaction tracker 40 may be determined based on configuration rules provided by the configuration repository 70. One or more of the IC records may be submitted to a remote server 90 from time to time, where they may be archived or where further processing may take place, as will also be described in further detail below.

Reference is now made to FIG. 7A, which is a graphical illustration of a data structure which may be used to store various temporal parameters related to certain items of the electronic technical documentation, as part of some embodiments of the invention. In FIG. 7A the data held is related to certain IIC's which are identified by an ID serial number. As mentioned above, each IIC is associated with a particular EMI that is part of the electronic technical documentation. Per each IIC (or and other item) in the table a number of parameters may be recorded and stored. In FIG. 7A there is shown a table which includes a user ID entry per each IIC/Item ID entry. This is one example of a table which may be generated and used to record data with respect to IICs and other items of the electronic technical documentation. In this table the primary key may be a composite key consisting of the item ID and the user ID per each item of the electronic technical documentation, and in particular, per each IIC, the ID of the user associated with the record. The table shown in FIG. 7A may be used to record information with respect of a plurality of IICs (and other items) and with respect to a plurality of users. In an alternative embodiment, the table shown in FIG. 7A may be the result of a selection of various entries from other tables and the joining thereof to generate the table shown in FIG. 7A. Those versed in the art may readily devise many other tables or any other data structures which may be used to record information with respect to a user's or various groups' performance and in particular at the discrete IIC level.

In the table shown in FIG. 7A, by way of example, per each combination of a certain IIC or other item ID and a specific user ID, there is recorded within the table one or more of: a user average time for completion (net or gross) of the respective IIC or item; a team average time for completion (net or gross) of the respective IIC or item (this parameter may relate to the user's team); a general (e.g., organization-wide) average time for completion (net or gross) of the respective IIC or item; an official time for completion of the respective IIC or item, for example, a publisher standard time; and the actual time required by the user to complete the IIC or item at the current maintenance session.

Referring now additionally to FIG. 1, the interaction tracker 40 may be adapted to monitor the events occurring within the context of an IIC 35 and may record various temporal parameters related to the IIC 35. In particular, the interaction tracker 40 may trace the start time and completion time of an IIC 35 or at least the duration from start to finish. The interaction tracker 40 may be adapted to record times and duration related to other states of an IIC and possibly of other events occurring within the context of an ITC, including events which do not result in the state of the IIC 35 being altered in response. The interaction tracker 40 may forward the data traced with respect to an IIC 35 to the local data manager 42 within the apparatus 100. The local data manager 42 may be adapted to control the distribution of the data traced by the interaction tracker 40 both within the apparatus 100, e.g. for storage on the local storage module 44, and to external entities, such as the maintenance tracking and analysis module 90. Those versed in the art would readily devise various distribution schemes for the data collected by the interaction tracker 40.

Figure 7B:
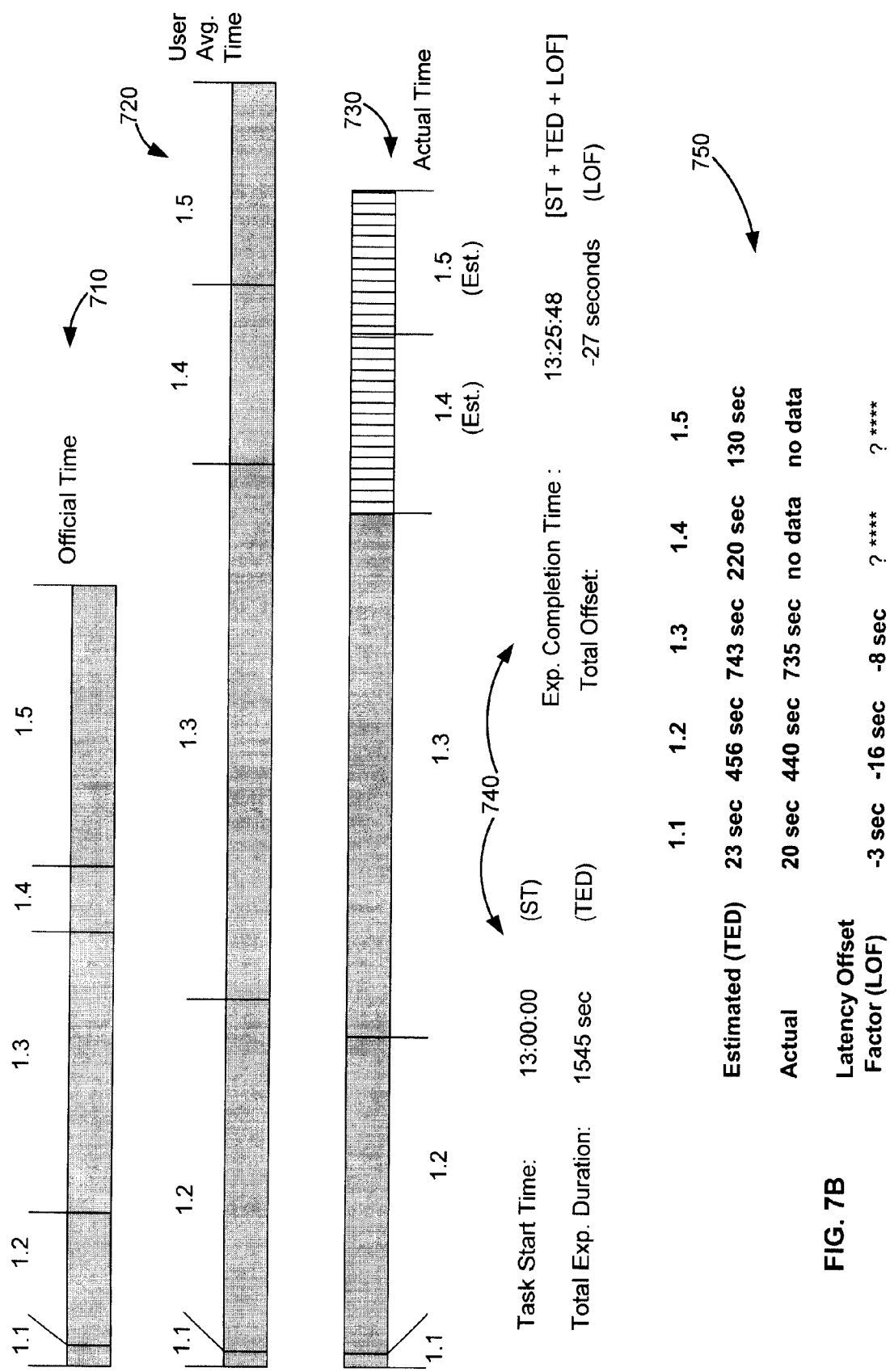
FIG. 7B is a graphical illustration of a display screen which may be generated based on the data recorded in the table shown in FIG. 7A, as part of some embodiments of the invention.

Reference is now made to FIG. 7B, which is a graphical illustration of a display screen which may be generated based on the data recorded in the table shown in FIG. 7A, as part of some embodiments of the invention. The processing of the data and the graphics may be generated on the external maintenance tracking and analysis module 90 which may service various clients including the various devices implementing the apparatus 100, and possibly also dedicated control or management terminals and various software applications and repositories configured to communicate with the maintenance tracking and analysis module 90 and adapted to request relevant data therefrom.

The tracking of an analysis module 90 may receive ongoing updates from each apparatus within the organization that is being utilized and may store the data in an appropriate table. In addition, to tracking the time an analysis module 90 may be adapted to process the data. For example, various averages may be calculated based on the data related to one or more IICs received from a specific user or from a plurality of users, such as for users that belong to a certain group, or an enterprise-wide analysis. For example, the table shown in FIG. 7A may be generated per each user and per each task. This table may be updated routinely during the user's maintenance session as the session and the respective data evolves. In one embodiment, the data with respect to a user's may be updated on the tracking of an analysis module 90 in near-time.

In one example, a monitoring workstation may be utilized by a maintenance supervisor to track ongoing maintenance activity carried out by the supervisor's subordinates. The monitoring workstation may be operatively connected to the tracking of an analysis module 90 and may extract updated data with respect to one or more maintainers performance and other reference data which may be required to enable various calculations involving the maintainers performance data and possibly various manipulations. For example, the supervisor may obtain updated data related to ongoing maintenance tasks and historical data or external data that is somehow connected to the ongoing maintenance tasks. The supervisor may retrieve data related to a specific maintainer, with respect to a certain group of maintainers, enterprise-wide data, data with respect to a certain equipment being serviced, data with respect to a certain tool being used, data based on work delays etc.

In a non-limiting example, the data obtained by the supervisor may include an ID of one or more step IIC or EMIs or other items of the electronic technical documentation to which the analysis shall relate, ID or IDs of the relevant user or users, user(s) average time for completion (net or gross) of the respective IIC(s) or item(s); a team average time for completion (net or gross) of the respective IIC(s) or item(s) (this parameter may relate to the user's team); a general (e.g., organization-wide) average time for completion (net or gross) of the respective IIC(s) or item(s); an official time for completion of the respective IIC(s) or item(s), for example, a publisher standard time, as may be incorporated within the electronic technical documentation; and the actual time required by the user(s) to complete the IIC(s) or item(s) during the current maintenance session. In another example, the supervisor may include an ID of one or more tasks assigned by the dispatcher to track properties such as their status and progress. In a further example, the supervisor may choose to view historical data of work already performed.

In the embodiments illustrated in FIG. 7B the analysis process is aimed at providing a visual indication with respect to a maintainer's progress, and for providing a predicted completion time for the maintainer's current task (and visualizing it). By way of example, the visual indication includes an official time bar 710 which provides a visual indication with respect to the official time prescribed for the completion of the five EMIs 1.1-1.5 which constitute the current task under monitoring. The next bar in this example is the user average time bar 720 which is generated based on this specific user's average. The user's average is calculated based on respective performance data reflecting the user's performance during previous sessions. The third bar 730 is partially based on actual data with respect to the user's current progress through the maintenance task which consists of the five EMIs 1.1-1.5. As is shown in FIG. 7B, the maintainer has completed the first three EMIs 1.1-1.3, and so for those EMIs the actual completion duration is available and is shown on the actual time bar 730. However, with respect to the remaining two EMIs, namely 1.4 and 1.5., there is no data yet, since the user is currently engaged with one or both. As is also shown in FIG. 7B, the tracking an analysis module 90 generates a prediction with respect to remaining EMIs 1.4 and 1.5., and also with respect to the remaining time for completion and with respect to the estimated completion time.

There are various methods and techniques which may be used to calculate various predictions, including predictions based on partial actual data and historical data or other respective reference data. The predictions may include work completion predictions, work progress predictions, delay predictions, etc. According to one example, a work completion prediction may be calculated as follows: (1) adding a value that is based on average completion durations for all EMIs (items) of interest to (2) the total Latency Offset Factor (LOF) value, which represents the deviation, in time, between a respective average duration and actual recorded duration for the relevant EMIs completed so far, and (3) finally adding to the start time of the procedure. Calculations that are based on a task start time, EMI averages and partial actual timing are shown in FIG. 7B and are collectively referenced by the numeral 740. A table in which the relevant values are stored is also illustrated and is referenced by the numeral 750.

According to certain embodiments the LOF may be continuously updated in real-time or in near-time during a maintainer's execution of the respective maintenance task, thereby enhancing the ability to predict the maintainer's progress rate according to his current performance. Different averages may be used for comparing work performance with different reference groups, and therefore it should be appreciated that the term average as used herein may refer to any available average in such a system, including but not limited to user personal average, team's average, all users average, official published durations etc. In addition the progress bar 730 displaying work progress may be used to indicate overtime LOF deviations in color coding, such as in Red, and deviations representing shorter times in another color, such as in Green. Additionally such a progress bar may display indication of steps and their duration as blocks with varying size in correlation with their duration or work volume.

The data collected with respect to a certain user's performance or with respect to a certain group of users' (e.g., a team) performance and also the data collected with respect to the users' implementation of a certain EMI or a certain group of EMIs may be processed and may provide useful information. For example, user's average times may be compared with his peers, with the team average, with the enterprise average and/or with the official published times. Those of ordinary skill in the art may readily devise many other uses for the information collected and stored with respect to a user's performance or with respect to a team performance or indeed the entire workforce. The high resolution of the data collected, that can be as high as a single EMI or even a single event occurring in the context of an EMI, may also be beneficial and may enable accurate and detailed processing of maintenance task information, both from the user(s) perspective and the EMI(s) perspective. The performance data generated by the various devices implementing the apparatus and forwarded to the tracking and analysis module may be processed and used in different ways and for various uses. Non-limiting examples of such uses include evaluation of a user's performance, improvement or lack of overtime, etc. In another example, extreme anomalies can be automatically detected and indicated, such as in cases where a user's average or LOF values exceed or are drastically lower than an allowed threshold. A discussion of still further advantages which may be obtained through the implementation and use of some embodiments of the present invention are provided below.

According to one embodiment, within an organization's network, IIC performance data may be accumulated. The performance data may be collected from one or more devices implementing the maintenance assistance and control apparatus. The IIC performance data may be associated with various users interaction(s) and system state(s) and event(s) occurring in the context of the respective IIC. The accumulated IIC performance data may be used to evaluate, for example, user, team or equipment performance such as in terms of speed, quality and other measurable aspects—all of which may be resolved at the discrete EMI level and in some cases at higher resolution, e.g., at a discrete event level. It would be appreciated, that evaluating such properties may contribute to resource optimization, training and may provide data for external resource allocation systems.

In some embodiments, an indication with respect to a person's performance and/or skill level in the context of a certain EMI(s) or maintenance task(s) may be induced from the performance data collected for that person in connection with respective EMI(s) or task(s). Based on the performance data indications may be generated with respect to the respective maintainers skill level, strengths and weaknesses. It would be appreciated that data in respect of a person's strengths and weaknesses can help create better performing teams for example. Task allocation can also benefit from behavioral pattern data in a similar way. It would be appreciated that many other aspects may benefit from the indication of such performance data for evaluation and processing.

In addition, in some embodiments, various optimizations may be utilized in conjunction with the performance data to devise improved task allocation schemes to enable best utilization of the workforce actual skills and strengths while mitigating weaknesses. Furthermore, according to some embodiments, the performance data may be stored and recorded for future use and analysis. For example, in case of a mishap, the recorded performance data may be pulled out of storage and may be analyzed to determine some correlation or other connection between the mishap and the performance of one or more maintainers involved in the maintenance procedure which might have led to that mishap or some correlation to various data recorded with respect to the state(s) or event(s) during the relevant period.

According to another embodiment of the invention, accumulated performance data may be used to improve the usefulness of the electronic technical documentation and the presentation thereof generated by the apparatus. For example, comparisons may be done on work durations before and after documentation updates. Additional measurable aspects may be used to determine quality of documentation changes, such as the number of events recorded in the context of the relevant IICs which are related to calls for assistance and critical user notes.

In further embodiments, the apparatus according to some embodiments of the invention may enable straightforward customization and adaptability with diverse hardware profiles while maintaining a unified and highly efficient presentation of electronic technical documentation, giving the maintainer the benefit of a simple-to-follow, list of interactively traceable steps. The added high resolution data tracing and recordation layer which enables extending the data processing and analysis capabilities of various enterprise monitoring, planning and allocation systems, is a further benefit of some embodiments of the present invention.

It would be appreciated that various embodiments of the apparatus may be implemented on various computerized devices, including for example, a laptop computer, a desktop computer, a dedicated handheld computerized device including mission specific hardware controls and interfaces, a netbook computer, a pocket PC, a cellular networks communication device with computer capabilities, etc. The proposed apparatus thus includes a processing unit or module (e.g., one or more CPUs), memory and storage and possibly also a communication interface. In case the apparatus is implemented as a mobile device, an RF transceiver is also included. In order to carry out various embodiments of the invention described in detail above, the components of the apparatus for providing assistance and control in respect of maintenance operations may be configured to utilize one or more of: the processing unit or module, the memory unit, the storage unit and possibly also the communication interface or may include counterpart dedicated components.

It would be appreciated that a further aspect of the present invention may relate to the process implemented by the apparatus described above. While in various places throughout the description of some embodiments of the present invention, a process of assisting and controlling electronic maintenance instructions, and specifically in respect of maintenance operations that are based on electronic technical documentation prescribing a set of discrete electronic maintenance instructions which are connected to one another according to a predefined hierarchy and predefined order, is described in the context of a particular apparatus on which the process may be implemented, further embodiments of the invention are not limited in this respect. According to such embodiments, the process of providing assistance and control in respect of maintenance operations that are based on electronic technical documentation prescribing a set of discrete electronic maintenance instructions which are connected to one another according to a predefined hierarchy and predefined order may be implemented on any suitable computerized device, and in particular on a computerized device which includes or that is connectable to various user input and output modules or devices. In still further embodiments the process of providing assistance and control in respect of maintenance operations may be implemented on a computerized device that is connected to various enterprise data resources and enterprise data processing entities.

In addition, the invention contemplates a computer program being readable by a computer for executing the method of the invention. The invention further contemplates a machine-readable memory tangibly embodying a program of instructions executable by the machine for executing the method of the invention.

Furthermore, it would be appreciated that yet a further aspect of the present invention may relate to a system for providing assistance and control in respect of maintenance operations that are based on electronic technical documentation prescribing a set of discrete electronic maintenance instructions which are connected to one another according to a predefined hierarchy and predefined order, that includes one or more devices implementing the apparatus described above. The maintenance assistance and control system which the apparatus is part of may include additional data repositories and data processing entities or platforms. Throughout the description of some embodiments of the present invention, reference was made to various data repositories and data processing entities which are operatively connected to a device implementing the apparatus and which may thus jointly constitute a maintenance assistance and control system in accordance with some embodiments of the invention.

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

The invention claimed is:

1. An apparatus for providing assistance and control in respect of maintenance operations that are based on electronic technical documentation prescribing a set of discrete electronic maintenance instructions ("EMIs") which are connected to one another according to a predefined hierarchy and predefined order, the apparatus comprising:
   a navigation controller that is adapted to provide a context pointer or a group of context pointers referencing one or more respective EMIs, the context pointer or pointers indicating a subset of EMIs from among the set of discrete EMIs which constitute a current context within the set of discrete EMIs;
   a documentation management module adapted to select a group of permitted EMIs from among the subset of EMIs in accordance with metadata associated with respective EMIs within the subset of EMIs, the metadata providing an access control specification related to the respective EMIs;
   the navigation controller is further adapted to provide an active instruction pointer referencing a current active electronic maintenance instruction ("EMI") selected from among the group of permitted EMIs; and
   an instruction controller generator that is responsive to said active instruction pointer for generating at least a respective active interactive instruction-controller ("active IIC") that is responsive to a predefined user-interaction and/or to a predefined system state or event corresponding with the active IIC for switching a state of the active IIC to a predefined state that is related to the predefined user-interaction and/or to the predefined system state or event.

2. The apparatus according to claim 1, wherein in response to the state of the active IIC being altered, a subsequent active instruction pointer is selected or a subsequent context pointer or a subsequent group of context pointers is selected.

3. The apparatus according to claim 2, wherein a subsequent context pointer or a subsequent group of context pointers are selected when the entire subset of EMIs which constitute the current context is complete.

4. The apparatus according to claim 3, wherein a subsequent active instruction pointer or a subsequent context pointer or group of context pointers are selected based on the new state of the previously active IIC.

5. The apparatus according to claim 4, wherein the instruction controller generator is adapted to set a state of each interactive instruction controller ("IIC") which corresponds to an EMI from the group of permitted EMIs that is not associated with the active instruction pointer to standby.

6. The apparatus according to claim 1, wherein the instruction controller generator is adapted to include within the active IIC data with respect to one or more possible states of the active IIC, and in association with each one of the one or more states, the instruction controller is adapted to specify a data input for triggering of the respective state.

7. The apparatus according to claim 6, wherein the instruction controller generator is adapted to include within the active IIC data with respect to one or more states of the IIC, and in connection with one or more of the states of the IIC, the instruction controller generator is adapted to provide a subsequent active instruction pointer or a subsequent context pointer or a subsequent group of context pointers that is associated with the respective state.

8. The apparatus according to claim 1, further comprising an interaction tracker that is adapted to generate a record for the IIC, the IIC record comprising at least data related to the predefined user-interaction and/or the predefined system state or event corresponding with the IIC.

9. The apparatus according to claim 8, wherein said IIC record comprises at least a temporal parameter that is related to at least one temporal aspect of the predefined user-interaction and/or the predefined system state or event corresponding with the IIC.

10. The apparatus according to claim 9, further comprising:
   a data manager that is adapted to manage storage and communication of an IIC record generated by said interaction tracker; and
   a maintenance-tracking repository that is adapted to store data thereon,
   wherein said data manager is adapted to store the IIC record on said maintenance-tracking repository.

11. The apparatus according to claim 10, wherein the data manager is adapted to communicate the IIC record to a remote computerized device that is associated with the apparatus, to enable processing on the remote computerized device of information related to the EMI associated with the respective IIC, and wherein processing of the IIC record includes taking into account a parameter or a circumstance associated with the user-interaction and/or with the predefined system state or event corresponding with the respective IIC.

12. The apparatus according to claim 11, wherein the remote computerized device is adapted to generate a temporal prediction based at least on the IIC record and historical or reference data related to the respective IIC record.

13. The apparatus according to claim 1, wherein the documentation management module is adapted to select the group of EMIs in accordance with a current user's profile and/or according to predefined configuration rules, the user's profile specifying at least credentials for the respective user, and the configuration rules permit or restrict access to certain EMIs from among the subset of EMIs according to the user's profile and/or according to the metadata that is associated with the EMIs.

14. The apparatus according to claim 13, wherein the documentation management module is further adapted to determine the order and hierarchy of the maintenance instructions within the group of permitted EMIs in accordance with the predefined hierarchy and the predefined order according to which the set of EMIs are connected to one another.

15. The apparatus according to claim 14, wherein the documentation management module is adapted to include within the selected group EMIs which, based on the predefined hierarchy and the predefined order, surround, precede or succeed the EMI that is referenced by the active instruction pointer and which are permitted according to the configuration rules and/or based on the user's profile and the access control specification related to the respective EMIs.

16. The apparatus according to claim 15, wherein in addition to the active instruction pointer, the documentation management module is adapted to obtain a pointer for each EMI in the group of permitted EMIs.

17. The apparatus according to claim 16, wherein the instruction controller generator is adapted to provide a presentation-specification for enabling rendering on a user-interface IICs associated with the permitted EMIs in the selected group.

18. The apparatus according to claim 17, wherein the instruction controller generator is adapted to generate the presentation-specification based on the current context pointer or the current group of context pointers, the current active instruction pointer, and the order and hierarchy according to which the set of EMIs are connected to one another.

19. The apparatus according to claim 18, wherein the instruction controller generator is adapted to include within the presentation-specification data representative of the active IIC generated for the EMI referenced by the active instruction pointer.

20. The apparatus according to claim 19, wherein the instruction controller generator is adapted to include within the presentation specification, in association with or as part of the data corresponding to the active IIC, data representative of a content of the EMI referenced by the active instruction pointer.

21. The apparatus according to claim 20, wherein with respect to the active IIC, the instruction controller generator is adapted to implement within the presentation specification a distinguishing presentation feature, to thereby enable distinctive presentation of the active IIC compared to the presentation of the other IICs corresponding to EMIs in the group of permitted EMIs that are not associated with the active instruction pointer.

22. The apparatus according to claim 20, wherein the instruction controller generator is further adapted to implement an input field specification, and wherein according to the input field specification, the instruction controller generator is adapted to include within the presentation specification, in association with or as part of the data corresponding to the active IIC, data representative of an input field for enabling a data input in connection with the active IIC.

23. The apparatus according to claim 22, wherein the instruction controller generator is further adapted to characterize the input field that is to be associated with the active IIC according to a configuration rule related to input field specification and/or according to respective metadata of the EMI associated with the active IIC.

24. The apparatus according to claim 23, wherein the data representative of the input field relates to one or more of the following types of input fields: a text input field, a drop-down list selection field, a radio-buttons selection field, a text box field, a file attachment field, a voice-recording input field, an image capture and recording field, a barcode input field, a global positioning system ("GPS") coordinates input field and a wireless reception parameter input field.

25. The apparatus according to claim 23, wherein the data representative of the input field indicates one or more of the following as possible sources of input: a GPS device, a Wireless Communications link, Cellular data or voice communications signal, a Camera or an Imager, a RFID device, a IR link, a Data Cable link, a on-screen touch operated manual input and a hardware button manual input.

26. The apparatus according to claim 21, wherein at least a portion of the data representative of the content of one or more of the permitted EMIs in the selected group that are not associated with the current active instruction pointer is disabled or removed from the presentation specification of the respective IICs.

27. A computer implemented method of providing assistance and control in respect of maintenance operations that are based on electronic technical documentation prescribing a set of discrete EMIs which are connected to one another according to a predefined hierarchy and predefined order, comprising:
obtaining a context pointer or a group of context pointers referencing one or more respective EMIs, the context pointer or pointers indicating a subset of EMIs from among the set of discrete EMIs which constitute a current context within the set of discrete EMIs;
selecting a group of permitted EMIs from among the subset of EMIs in accordance with metadata associated with respective EMIs within the subset of EMIs, the metadata providing an access control specification related to the respective EMIs;
selecting an active instruction pointer referencing a current active EMI, the current active EMI selected from among the group of permitted EMIs; and
in response to selection of the active instruction pointer generating at least a respective active IIC that is responsive to a predefined user-interaction and/or to a predefined system state or event corresponding with the IIC for switching a state of the active IIC to a predefined state that is related to the predefined user-interaction and/or to the predefined system state or event.

28. The computer implemented method according to claim 27, wherein said selecting an active instruction pointer further comprises, in response to the state of an active IIC being altered, selecting a subsequent active instruction pointer or selecting a subsequent context pointer or a subsequent group of context pointers.

29. The computer implemented method according to claim 28, wherein said selecting an active instruction pointer comprises, selecting a subsequent context pointer or a subsequent group of context pointers in case the entire subset of EMIs which constitute the current context is complete.

30. The computer implemented method according to claim 29, wherein said selecting an active instruction pointer comprises, selecting a subsequent active instruction pointer or a subsequent context pointer or group of context pointers based on the new state of the IIC.

31. The computer implemented method according to claim 30, wherein selecting a group of permitted EMIs comprising setting a state of each IIC which corresponds to an EMI from the group of permitted EMIs that is not associated with the active instruction pointer to standby.

32. The computer implemented method according to claim 27, wherein said generating at least a respective active IIC comprises, including within the active IIC data with respect to one or more possible states of the active IIC, and in association with each one of the one or more states, specifying a data input for triggering of the respective state.

33. The computer implemented method according to claim 32, wherein said including within the active IIC data with respect to one or more possible states of the active IIC comprises, providing in connection with one or more of the possible states of the active IIC a subsequent active instruction pointer or a subsequent context pointer or a subsequent group of context pointers that is associated with the respective state.

34. The computer implemented method according to claim 27, further comprising generating a record for the IIC, the IIC record including at least data related to the predefined user-interaction and/or the predefined system state or event corresponding with the IIC.

35. The computer implemented method according to claim 34, wherein said generating a log for the IIC further comprises, recording within the IIC record at least a temporal parameter that is related to at least one temporal aspect of the predefined user-interaction and/or the predefined system state or event corresponding with the IIC.

36. The computer implemented method according to claim 35, further comprising processing the IIC record to generate information related to the EMI associated with the respective IIC, and wherein processing of the IIC record includes taking into account a parameter or a circumstance associated with the user-interaction and/or with the predefined system state or event corresponding with the respective IIC.

37. The computer implemented method according to claim 36, wherein said processing comprises, generating a temporal prediction based at least on the IIC record and historical or reference data related to the respective IIC record.

38. The computer implemented method according to claim 27, wherein said selecting a group of permitted EMIs further comprises, selecting the group of permitted EMIs in accordance with a current user's profile and/or according to predefined configuration rules, the user's profile specifying at least credentials for the respective user, and the predefined configuration rules permit or restrict access to certain EMIs from among the subset of EMIs according to the user's profile and/or according to the metadata that is associated with the respective EMIs.

39. The computer implemented method according to claim 38, wherein said selecting a group of permitted EMIs comprises, determining the order and hierarchy of the maintenance instructions within the group of permitted EMIs in accordance with the predefined hierarchy and the predefined order according to which the set of EMIs are connected to one another.

40. The computer implemented method according to claim 39, wherein said selecting a group of permitted EMIs comprises including within the selected group EMIs which, based on the predefined hierarchy and the predefined order, surround, precede or succeed the EMI that is referenced by the active instruction pointer and which are permitted according to the configuration rules and/or based on the user's profile and the access control specification related to the respective EMIs.

41. The computer implemented method according to claim 40, further comprising obtaining a pointer for each EMI in the group of permitted EMIs.

42. The computer implemented method according to claim 41, further comprising providing a presentation-specification for enabling rendering on a user-interface IICs associated with the EMIs in the group of permitted EMIs.

43. The computer implemented method according to claim 42, wherein said providing a presentation-specification comprises generating the presentation-specification based on the current context pointer or the current group of context pointers, the current active instruction pointer, and the order and hierarchy according to which the set of EMIs are connected to one another.

44. The computer implemented method according to claim 43, wherein the presentation-specification includes data representative of the active IIC generated for the EMI referenced by the active instruction pointer.

45. The computer implemented method according to claim 44, wherein the presentation-specification, in association with or as part of the data corresponding to the active IIC, includes data representative of a content of the EMI referenced by the active instruction pointer.

46. The computer implemented method according to claim 45, wherein the presentation-specification, in association with or as part of the data corresponding to the active IIC, includes an input field specification for enabling a data input in connection with the active IIC.

47. The computer implemented method according to claim 46, wherein said including an input field specification comprises, characterizing the input field according to a configuration rule related to input field specification and/or according to respective metadata of the EMI associated with the active IIC.

48. The computer implemented method according to claim 45, wherein with respect to the active IIC, the presentation specification includes a distinguishing presentation feature, to thereby enable distinctive presentation of the active IIC compared to the presentation of the other IICs corresponding to EMIs in the group of permitted EMIs that are not associated with the active instruction pointer.

49. The computer implemented method according to claim 48, wherein at least a portion of the data representative of the content of one or more of the IICs corresponding to EMIs in the group of permitted EMIs that are not associated with the active instruction pointer is disabled or removed from the presentation specification.

50. A program storage device readable by machine, tangibly embodying a program of instructions executable by the machine to perform a method of providing assistance and control in respect of maintenance operations that are based on electronic technical documentation prescribing a set of discrete EMIs which are connected to one another according to a predefined hierarchy and predefined order, comprising:
  obtaining a context pointer or a group of context pointers referencing one or more respective EMIs, the context pointer or pointers indicating a subset of EMIs from among the set of discrete EMIs which constitute a current context within the set of discrete EMIs;
  selecting a group of permitted EMIs from among the subset of EMIs in accordance with metadata associated with respective EMIs within the subset of EMIs, the metadata providing an access control specification related to the respective EMIs;
  selecting an active instruction pointer referencing a current active EMI, the current active EMI selected from among the group of permitted EMIs; and
  in response to selection of the active instruction pointer generating at least a respective active IIC that is responsive to a predefined user-interaction and/or to a predefined system state or event corresponding with the IIC for switching a state of the active IIC to a predefined state that is related to the predefined user-interaction and/or to the predefined system state or event.

* * * * *